(12) United States Patent
Puri et al.

(10) Patent No.: US 10,565,750 B2
(45) Date of Patent: Feb. 18, 2020

(54) INTELLIGENT VISUALIZATION MUNGING

(71) Applicant: Accenture Global Solutions Limited, Dublin (IE)

(72) Inventors: Colin Anil Puri, San Jose, CA (US); Joseph Bynoe, San Francisco, CA (US); Paul Justin Mahler, San Francisco, CA (US); Nathan GS Shetterley, San Francisco, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 302 days.

(21) Appl. No.: 15/253,461

(22) Filed: Aug. 31, 2016

(65) Prior Publication Data
US 2017/0061659 A1    Mar. 2, 2017

Related U.S. Application Data

(60) Provisional application No. 62/212,410, filed on Aug. 31, 2015.

(51) Int. Cl.
*G06T 11/20* (2006.01)
*G06N 20/00* (2019.01)
*G06F 16/23* (2019.01)
*G06Q 10/06* (2012.01)

(52) U.S. Cl.
CPC .......... *G06T 11/206* (2013.01); *G06F 16/23* (2019.01); *G06N 20/00* (2019.01); *G06Q 10/063* (2013.01)

(58) Field of Classification Search
CPC ............... G06T 11/206; G06F 17/30345
See application file for complete search history.

(56) References Cited

U.S. PATENT DOCUMENTS

| 9,984,152 B2 | 5/2018 | Nasser et al. |
| 2006/0238919 A1 | 10/2006 | Bradely |
| 2008/0249925 A1* | 10/2008 | Nazari ............... G06Q 40/00 705/38 |

(Continued)

OTHER PUBLICATIONS

Kandel, S. et al., "Wrangler:Interactive visual specification of data transformation scripts." Proceedings of the SIGCHI Conference on Human Factors in Computing Systems. ACM, 2011. [retrieved from internet on Oct. 25, 2016]. 10 pages. <URL: http://datascienceassn.org/sites/default/files/Wrangler%20Interactive%20Visual%20Speci%EF%AC%81cation%20of%20Data%20Transformation%20Scripts.pdf>.

(Continued)

*Primary Examiner* — Scott T Baderman
*Assistant Examiner* — Steve P Golden
(74) *Attorney, Agent, or Firm* — Mannava & Kang, P.C.

(57) ABSTRACT

According to examples, intelligent visualization munging may include transforming and enriching data that is to be visualized, determining features of the transformed and enriched data, determining a user role of a user associated with the transformed and enriched data, and a user interaction of the user. Intelligent visualization munging may further include learning a behavior of the user, and analyzing the features, the user role, the user interaction, and a learned behavior model to generate a recommendation that includes a predetermined number of visualizations from a plurality of available visualizations to display the transformed and enriched data. The predetermined number of visualizations is less than the plurality of available visualizations.

19 Claims, 21 Drawing Sheets

(56) References Cited

U.S. PATENT DOCUMENTS

| | | | | |
|---|---|---|---|---|
| 2011/0110515 | A1* | 5/2011 | Tidwell | H04N 21/23109 380/200 |
| 2011/0302124 | A1* | 12/2011 | Cai | G06F 17/30707 706/52 |
| 2012/0123924 | A1* | 5/2012 | Rose | G06Q 20/12 705/35 |
| 2013/0151383 | A1* | 6/2013 | Gancarz | G06Q 40/02 705/30 |
| 2013/0222387 | A1* | 8/2013 | Bradshaw | G06T 11/206 345/440 |
| 2013/0347064 | A1* | 12/2013 | Aissi | G06F 21/30 726/2 |
| 2014/0025597 | A1 | 1/2014 | Brikman et al. | |
| 2014/0071138 | A1* | 3/2014 | Gibson | G06T 11/206 345/501 |
| 2014/0101093 | A1* | 4/2014 | Lanphear | G06F 17/30563 707/602 |
| 2014/0115013 | A1* | 4/2014 | Anderson | G06F 17/30303 707/812 |
| 2015/0160373 | A1 | 6/2015 | Feldman-Fitzthum et al. | |
| 2015/0205692 | A1 | 7/2015 | Seto | |
| 2015/0356123 | A1 | 12/2015 | Gorelik | |
| 2016/0055574 | A1* | 2/2016 | Rangarajan | G06Q 30/0641 705/27.1 |
| 2016/0103920 | A1 | 4/2016 | Lee et al. | |
| 2016/0188663 | A1 | 6/2016 | Tsumura et al. | |

OTHER PUBLICATIONS

Knoblock, C. et al. "Semantics for Big Data Integration and Analysis." 2013 AAAI Fall Symposium Series, Nov. 12, 2013. [retrieved from internet on Oct. 25, 2016]. 4 pages. <URL: http://www.isi.edu/integration/papers/knoblock13-sbd.pdf>.

Heer, J. et al. "Predictive Interaction for Data Transformation." Conference on Innovative Data Systems Research (CIDR), Jan. 4-7, 2015. [retrieved from internet on Oct. 25, 2016]. 7 pages. <URL: https://pdfs.semanticscholar.org/a3f7/06941ada1a6420db9855bf8c3fe680f50cb7.pdf>.

Guo, P., et al. "Proactive wrangling: mixed-initiative end-user programming of data transformation scripts." Proceedings of the 24th annual ACM symposium on User interface software and technology. ACM, 2011. [retrieved from internet on Oct. 25, 2016]. 10 pages. <URL: http://db.cs.berkeley.edu/papers/uist11-wrangler.pdf>.

Gotz, D. et al., Behavior-Driven Visualization Recommendation, Proceeding of the 14th International Conference on Intelligent User Interfaces, ACM, 2009, pp. 315-324 [retrieved from internet on Dec. 6, 2016] <URL:http://gotz.web.unc.edu/files/2013/10/gotz_iui_2009.pdf>.

Voigt, M. et al., "Context-aware Recommendation of Visualization Components", Proceedings of the Fourth International Conference on Information, Process and Knowlegde Management, 2012, pp. 101-109 [retrieved from internet on Dec. 6, 2016] <URL:http://larsgrammel.de/publications/voigt_2012_vis_recommendation.pdf>.

* cited by examiner

1700

TRANSFORM AND ENRICH DATA THAT IS TO BE VISUALIZED
1702

DETERMINE FEATURES OF THE TRANSFORMED AND ENRICHED DATA
1704

DETERMINE A USER ROLE OF A USER ASSOCIATED WITH THE TRANSFORMED AND ENRICHED DATA, AND A USER INTERACTION OF THE USER ASSOCIATED WITH THE TRANSFORMED AND ENRICHED DATA
1706

LEARN A BEHAVIOR OF THE USER ASSOCIATED WITH THE TRANSFORMED AND ENRICHED DATA
1708

ANALYZE THE FEATURES OF THE TRANSFORMED AND ENRICHED DATA, THE USER ROLE OF THE USER ASSOCIATED WITH THE TRANSFORMED AND ENRICHED DATA, THE USER INTERACTION OF THE USER ASSOCIATED WITH THE TRANSFORMED AND ENRICHED DATA, AND A LEARNED BEHAVIOR MODEL
1710

GENERATE, BASED ON THE ANALYSIS OF THE FEATURES OF THE TRANSFORMED AND ENRICHED DATA, THE USER ROLE OF THE USER ASSOCIATED WITH THE TRANSFORMED AND ENRICHED DATA, THE USER INTERACTION OF THE USER ASSOCIATED WITH THE TRANSFORMED AND ENRICHED DATA, AND THE LEARNED BEHAVIOR MODEL, A RECOMMENDATION THAT INCLUDES A PREDETERMINED NUMBER OF VISUALIZATIONS FROM A PLURALITY OF AVAILABLE VISUALIZATIONS TO DISPLAY THE TRANSFORMED AND ENRICHED DATA
1712

IDENTIFY, BASED ON THE ANALYSIS OF THE FEATURES OF THE TRANSFORMED AND ENRICHED DATA, THE USER ROLE OF THE USER ASSOCIATED WITH THE TRANSFORMED AND ENRICHED DATA, THE USER INTERACTION OF THE USER ASSOCIATED WITH THE TRANSFORMED AND ENRICHED DATA, AND THE LEARNED BEHAVIOR MODEL, AN ANOMALY IN DISPLAYS OF THE RECOMMENDED VISUALIZATIONS
1714

FIG. 17 (CONT)

INTELLIGENT VISUALIZATION MUNGING

CROSS-REFERENCE TO RELATED APPLICATION(S)

This application claims the benefit of Provisional Patent Application Ser. No. 62/212,410, filed Aug. 31, 2015, which is expressly incorporated herein by reference.

BACKGROUND

Data munging may be described as the process of converting or mapping data from one raw form into another format that allows for consumption of the data. For example, the data may be consumed for display in a visual or another type of format to facilitate comprehension of the data.

BRIEF DESCRIPTION OF DRAWINGS

Features of the present disclosure are illustrated by way of examples shown in the following figures. In the following figures, like numerals indicate like elements, in which:

FIG. 17 illustrates a flowchart of another method for intelligent visualization munging, according to an example of the present disclosure.

DETAILED DESCRIPTION

Figure 1:
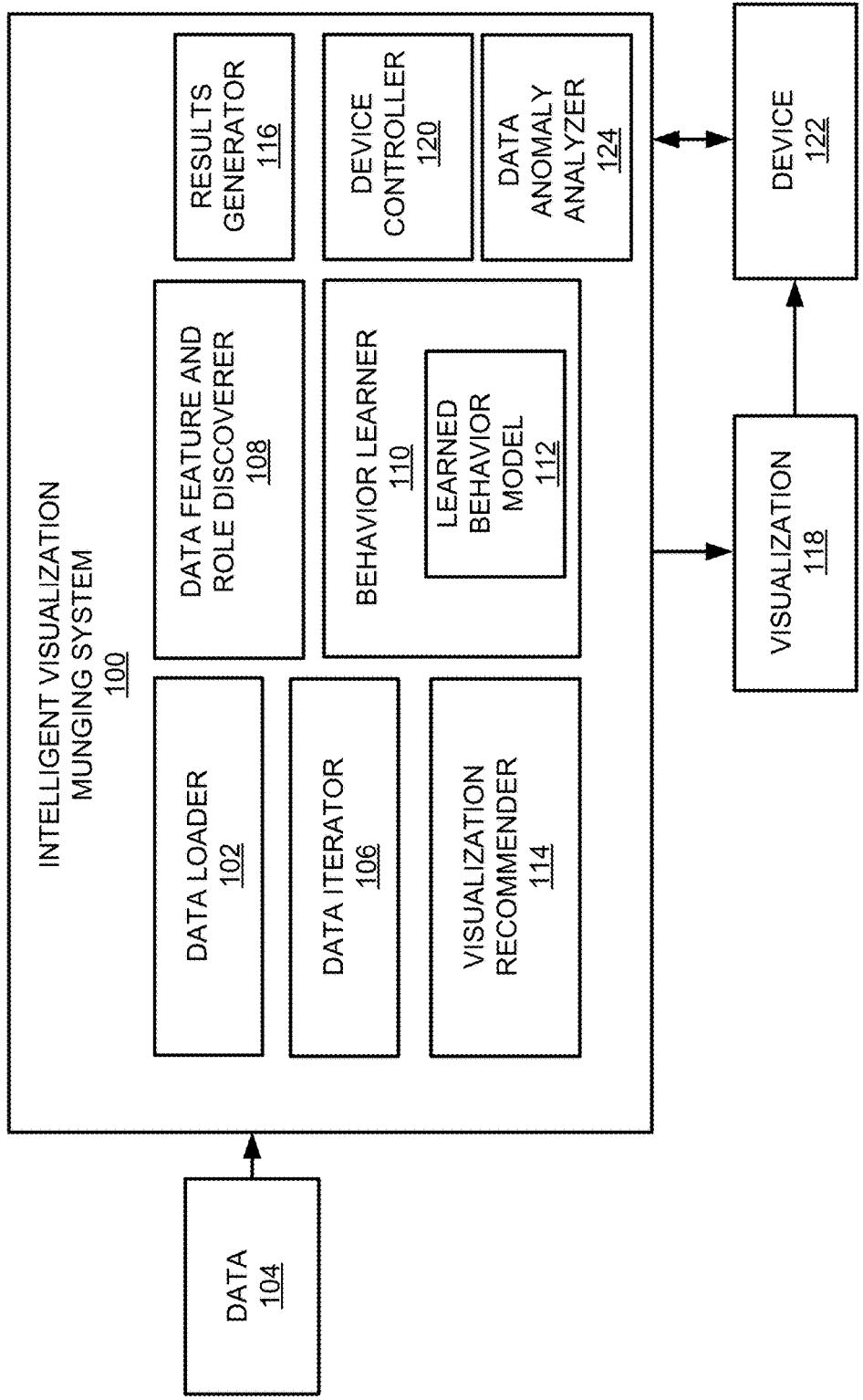
FIG. 1 illustrates an intelligent visualization munging system, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, methods and structures apparent to one of ordinary skill in the art have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, an intelligent visualization munging system, a method for intelligent visualization munging, and a non-transitory computer readable medium having stored thereon a computer executable program to provide intelligent visualization munging are disclosed herein. The system, method, and non-transitory computer readable medium disclosed herein may include a data loader to ascertain data that is to be visualized. As disclosed herein in further detail, a data iterator may transform and enrich the ascertained data. A data feature and role discoverer may determine features of the transformed and enriched data, a user role of a user associated with the transformed and enriched data, and a user interaction of the user associated with the transformed and enriched data. A behavior learner may learn a behavior of the user associated with the transformed and enriched data. A visualization recommender may analyze the features of the transformed and enriched data, the user role of the user associated with the transformed and enriched data, the user interaction of the user associated with the transformed and enriched data, and a learned behavior model to generate a recommendation that includes a predetermined number of visualizations from a plurality of available visualizations to display the transformed and enriched data. The predetermined number of visualizations is less than the plurality of available visualizations. Further, the visualization recommender may receive selection of a visualization from the predetermined number of recommended visualizations. A results generator may generate a display of the transformed and enriched data using the selected visualization from the predetermined number of recommended visualizations.

With respect to visualizations, a visual depiction of a data set may be based on skills, biases, and other background aspects for a data analyst who may generate the visual depiction. In this regard, if information is presented in an unexpected manner, deciphering and understanding the data signal may take longer or may not occur at all.

Selection of the best visualization for a given data can be challenging. For example, a visualization should communicate insights in a succinct and thoughtful manner that is impactful for a given role, target audience, and provide visualizations designed for voluminous/large scale data sets.

With respect to visualizations, discovering what is important for certain audiences may require researching how individuals and groups react to a body of data visualizations. Learning and researching new visualization types may be paired with methodologies for measuring visualization effectiveness. Research may also be performed with respect to improving perception, understanding, and emphasis to target audiences. Without proper depictions of underlying analytic outcomes, it may be challenging to explain the story of a data set being presented, and insight may be lost. Additionally, interactive visualizations may present a methodology to understand and communicate the complex nature of data in all of its forms.

Outstanding questions in visualization research may include, for example, how can end users transform data with expressive and effective visualizations, how can visualizations support and work with high responsivity on top of massive data sets, how can visualizations be used to guide analysts, can visualizations be guided algorithmically to produce the best result for given data sets, etc. Answering these questions may facilitate the efficient production of effective visualizations and actionable insights.

With respect to creation of a visualization story, a first step may include providing the correct mix of information to display the information accurately and precisely. Further, with respect to creation of a visualization story, visualizations that improve cognition and generate indelible images while still providing a purpose may be produced.

A visualization for a set of data may be provided based on a set of pre-defined curated rules. Using such a rule-based approach may limit visualization of a set of data to various groupings of a predetermined number (e.g., 15-20) visualizations. Pre-existing templates and stock fonts may provide for streamlining of such visualizations, but may also prevent users from ascertaining the insight from data, and may not include the best visualizations for a problem at hand.

In order to address the aforementioned technical challenges with respect to generation of visualizations, according to examples, the system, method, and non-transitory computer readable medium disclosed herein may use data set features that are extracted from data sets, and other aspects such as user/target roles, and user/target interactions, etc., to generate visualization recommendations. For example, if a data set includes date-formatted fields, the system, method, and non-transitory computer readable medium disclosed herein may recommend, based on a higher likelihood, a time-series visualization. When a new feature set is generated, the system, method, and non-transitory computer readable medium disclosed herein may recommend a predetermined number (e.g., the top four) of visualizations that fit the data set.

According to examples, the system, method, and non-transitory computer readable medium disclosed herein may use past feature set extractions to generate a learning model relating feature sets to visualization recommendations. In order to generate the learning model, the system, method, and non-transitory computer readable medium disclosed herein may perform a multinomial logistic regression on the past extractions. The multinomial logistic regression may be described as a classification technique that generalizes logistic regression to multiclass problems, where outcomes may include more than two possible discrete values. The multinomial logistic regression model may be used to predict the probabilities of the different possible outcomes of a categorically distributed dependent variable, given a set of independent variables, where the independent variables may be real-valued, binary-valued, categorical-valued, etc.

According to examples, the system, method, and non-transitory computer readable medium disclosed herein may implement customized techniques to provide recommendations for appropriate visualizations based, for example, on use case, data set features, data set domain, manipulations to data, data types, and from learned behaviors of previous users interacting with the same or similar data.

The use case may be described as an overall specific area of the data (e.g., auto insurance data, or auto mileage data, etc.), and may be associated with a plurality of visualizations as disclosed herein. The features may be described, for example, as a type of the data. For example, a feature of a set of the data may include numerical data, textual data, graphical data, location data, whether the data is geocoded, whether the data includes zip codes, and/or a noise level of the data, etc. The data set domain may be described as an area of the data (e.g., insurance data, mileage data, etc.). The manipulations to the data may be described as any action performed on the data (e.g., a merge, a split, etc.). The data types may be described as the different types of data in a set of the data (e.g., a data type that includes numerical data and textual data, etc.).

The use case, data set features, data set domain, manipulations to data, data types, and learned behaviors of previous users interacting with the same or similar data may be implemented as classifiers using multinomial logistic regression, and thus mapped to generate the learned behavior model as disclosed herein to ascertain a recommendation of a visualization or a set of visualizations. The learned behavior model may be used to predict probabilities of different possible outcomes of a categorically distributed dependent variable (e.g., visualizations), given a set of independent variables (e.g., known features, user roles, etc., that are previously mapped to visualizations), where the independent variables may be real-valued, binary-valued, categorical-valued, etc. The multinomial logistic regression may identify which features, user roles, etc., are predominate for a set of visualizations.

For a new set of data that includes a set of features, user roles, etc., this information may be analyzed based on application of the multinomial logistic regression with respect to the learned behavior model to determine which class or classes of the learned behavior model include a highest probability of corresponding to the set of features, user roles, etc. for the new set of the data. The determined class may thus represent the visualization that is recommended with respect to the new set of the data. The plurality of visualizations may be recommended in the event a plurality of classes are determined to likely correspond to the set of features, user roles, etc. for the new set of the data.

A class may be selected based on a threshold based comparison, where the class or classes that are determined include the highest probability of corresponding to the set of features, user roles, etc., for the new set of the data.

In the event a user selects visualizations that are not recommended, and a plurality of such selections (e.g., a specified number of such selections) are made within a predetermined time interval (i.e., denoted as selection drift), the learned behavior model may be re-generated to incorporate information with respect to user's selection of the different visualizations. In this regard, a drift counter may be updated every time a user selects a visualization or visualizations that are not recommended, where the selections are made within a predetermined time interval (e.g., 5 minutes).

According to examples, for the system, method, and non-transitory computer readable medium disclosed herein, a user of any ability may load data features, and the system, method, and non-transitory computer readable medium disclosed herein may guide the user to the best appropriate visualization or group of visualizations, and use case alignment based on previously learned behaviors and best practices.

According to examples, the system, method, and non-transitory computer readable medium disclosed herein may provide users with the flexibility to use predetermined visualizations and standardized design rules, and also the ability to seamlessly adapt to situations that require advanced customizations.

According to examples, the system, method, and non-transitory computer readable medium disclosed herein may provide for identification of the correct visualization(s) from several (e.g., hundreds or thousands) of options based on the provided data set. In this regard, the system, method, and non-transitory computer readable medium disclosed herein may provide for pairing of artificial intelligence with a substantially larger set of possible visualization options to increase the likelihood of a user (e.g., an analyst) applying the most insightful visualization without spending a large amount of time browsing through possibilities.

According to examples, the system, method, and non-transitory computer readable medium disclosed herein may provide incorporation of data about users (e.g., who are they, who do they normally present to, etc.). This demographic information may be used to improve predictive performance by tailoring the recommendation for the audience. The system, method, and non-transitory computer readable medium disclosed herein may make recommendations with limited information. Further, the system, method, and non-transitory computer readable medium disclosed herein may learn from user feedback and new use cases to improve visualization recommendations over time.

According to examples, with respect to technical challenges related, for example, to visualization munging, the system, method, and non-transitory computer readable medium disclosed herein may provide for tailoring of results for the correct data set(s). The system, method, and non-transitory computer readable medium disclosed herein may provide for the comprehension of consequences of and learning the correct transformation operation(s). The system, method, and non-transitory computer readable medium disclosed herein may provide for performance of tasks with high responsivity (i.e., low latency), and operation in an information-impoverished environment (i.e., with little to no existing recommendations, ontological, reference information, and/or rules).

According to examples, with respect to technical challenges related, for example, to visualization munging, the system, method, and non-transitory computer readable medium disclosed herein may provide for guidance with respect to the creation of visual analytics by providing recommendations with or without a priori knowledge of a recommendation set, providing recommendations using sparse and/or impoverished information on roles, targets, or recommendations, and learning common behaviors to create profiles that lead to utilization of certain visualizations. The system, method, and non-transitory computer readable medium disclosed herein may provide for discovery of features of user roles and/or user targets that lead to visualizations, discovery of data set features and correlation of those features to certain visualizations that are designed for voluminous data sets (e.g., utilizing technologies), and performance of operations in real-time, low latency, and in streaming modality.

According to examples, the system, method, and non-transitory computer readable medium disclosed herein may provide various technical benefits such as reduction of the time to produce memorable and insightful visualizations, and leveraging of information from a disparate set of contexts. Based on repeated usage, the system, method, and non-transitory computer readable medium disclosed herein may learn which visualizations and use cases are applicable to a given data set by understanding the users, target audiences, data set information, and data cleaning process.

According to examples, the system, method, and non-transitory computer readable medium disclosed herein may be part of a design pipeline denoted Industrializing D3 (or ID3). In this regard, the system, method, and non-transitory computer readable medium disclosed herein may simplify the data visualization process by guiding users through a set of steps from data ingestion to data visualization.

According to examples, the system, method, and non-transitory computer readable medium disclosed herein may reduce the dimensionality of the dataset into a predetermined set of features. For example, for data that includes state, city, and zip code information, the dimensionality of the data may be reduced by eliminating the state and city information which is determinable based on the zip code information. This feature set may be forwarded, for example, to a visualization recommender as disclosed herein for generation of visualization recommendations.

According to examples, the system, method, and non-transitory computer readable medium disclosed herein may examine aspects of user behavior, and learn what the best visualization is for a given use case alignment of data that an end user may want to visualize.

According to examples, the system, method, and non-transitory computer readable medium disclosed herein may apply machine learning to guide a user towards the selection of an ideal visualization that matches the user's requirements. As users contribute new designs and use cases into an information base, the system, method, and non-transitory computer readable medium disclosed herein may learn and provide recommendations to users towards the determination of the best possible decision, for example, through an expert guidance sub-system.

According to examples, the system, method, and non-transitory computer readable medium disclosed herein may provide for comprehension of an enterprise, based, for example, on intelligent visualization, which analyzes and/or facilitates analysis of data related to the enterprise.

According to examples, the system, method, and non-transitory computer readable medium disclosed herein may provide for the reduction of the time to delivery of analytic and visualization work flows.

The system, method, and a non-transitory computer readable medium disclosed herein further provide technical solutions to technical problems, related, for example, to intelligent visualization munging. For example, with respect to Extract, Transform and Load (ETL), data extraction refers to the extraction of data from homogeneous or heterogeneous data sources, data transformation refers to the transformation of the data for storing the data in a specified format or structure, where the stored data may be used for querying and further analysis, and data loading refers to the loading of the data into a target destination, such as, a database, etc. With respect to ETL, the system, method, and non-transitory computer readable medium disclosed herein provide technical solutions to technical problems, related, for example, to visualization of data, where the data may then be stored in a specified format or structure, where the stored data may be used for querying and further analysis. For example, with respect to ETL, the data may be visualized to reduce the usage of computer resources that are otherwise used to analyze the data prior to visualization. In this regard, the system, method, and non-transitory computer readable medium disclosed herein may be used with any type of operation associated with ETL.

The system, method, and non-transitory computer readable medium disclosed herein further provide technical solutions to technical problems, related, for example, to control of a device based on the visualized data. For example, the visualized data may be queried to authenticate and thus control a device (or operations associated with a device) such as an automatic teller machine (ATM). Based on feedback from the device (e.g., a confirmed authentication, etc.), the system, method, and non-transitory computer readable medium disclosed herein may further control operation of the device, and/or other associated devices.

The system, method, and non-transitory computer readable medium disclosed herein further provide technical solutions to technical problems, related, for example, to real-time anomaly identification and visualization in data, such as log file data. In many instances, anomaly identification in log file data can be a daunting task, for example, due to the extensive volume of such log files. The system, method, and non-transitory computer readable medium disclosed herein provide the technical solution of accessing data that is to be analyzed for an anomaly, transforming and enriching the accessed data, determining features of the transformed and enriched data, determining other aspects such as a user role and/or a user interaction of a user associated with the transformed and enriched data, and learning a behavior of the user associated with the transformed and enriched data. Based on an analysis of these factors, a visualization is recommended from a plurality of available visualizations to identify and display the anomaly. Absent the transformation and enrichment of the data, the determination of the features, the determination of user role and/or the user interaction, and the learning of the behavior of the user, the anomaly may not otherwise be identifiable. Further, in response to a determination that the data includes the anomaly, a device associated with the data may be controlled. In this regard, the system, method, and non-transitory computer readable medium disclosed herein provide the technical solution to a technical problem of identification of an anomaly and/or controlling a device based on the identification of an anomaly. For example, a device, such as an automatic teller machine (ATM) may be controlled to initiate a lock-down mode based on the identification of an anomaly related to access to the ATM. Alternatively or additionally, a firewall associated with the data and/or the device may be controlled to place a network in a secure mode. Thus, any type of device may be controlled based on identification of an anomaly related to operation of the device.

FIG. 1 illustrates an intelligent visualization munging system 100 (e.g., system 100 as disclosed herein), according to an example of the present disclosure. Referring to FIG. 1, the system 100 may include a data loader 102 to load and ingest data 104. The data loader 102 may be designated as a data hardware loader 102 that includes a hardware processing circuit, to execute the methods, functions and other processes described herein, or alternatively, the data loader 102 may be executed by at least one hardware processor (e.g., the processor 1602 of FIG. 16 and/or the processor 1804 of FIG. 18).

A data iterator 106 may transform and enrich the data 104. The transformation may include, for example, any change to the structure and/or organization of the data (e.g., by removal of a dash between "state-city-zip code", and splitting of the data 104 to re-organize the data 104 as "state, city, zip code", etc.). The enrichment may include any type of modification of the data 104 (e.g., to complete or add state and city information based on zip code information), to complete and/or otherwise add further details to the data 104. Based on the transformation and enrichment, the data iterator 106 may place the data 104 in a canonical format for further processing. The data iterator 106 may be designated as a data hardware iterator 106 that includes a hardware processing circuit, to execute the methods, functions and other processes described herein, or alternatively, the data iterator 106 may be executed by at least one hardware processor (e.g., the processor 1602 of FIG. 16 and/or the processor 1804 of FIG. 18).

A data feature and role discoverer 108 may determine data set features, user/target roles and behaviors, and implement enrichment of the data set features, and user/target roles and behaviors. The data feature and role discoverer 108 may be designated as a data feature and role hardware discoverer 108 that includes a hardware processing circuit, to execute the methods, functions and other processes described herein, or alternatively, the data feature and role discoverer 108 may be executed by at least one hardware processor (e.g., the processor 1602 of FIG. 16 and/or the processor 1804 of FIG. 18).

A behavior learner 110 may learn typical behaviors, and enrich learned behaviors. For example, the behavior learner 110 may learn typical behaviors, and enrich learned behaviors for a learned behavior model 112. The learned behavior model 112 may represent a model that is developed and further enriched based on learned behaviors on how certain features are mapped to selection of a particular visualization or a set of visualizations. The behaviors may also include any type of operations performed on the data 104 by a user (e.g., a merge, a split, etc., and/or a sequence associated with the merge, split, etc.). For example, features associated with numerical data may be used to select bar-graph type of visualizations (or pie-graph type of visualizations, etc.). Accordingly, the learned behavior model 112 may be developed based on the mapping of bar-graph type visualizations to features associated with numerical data, and further enriched if another type of visualization is selected for the same or similar type of features. In this regard, the learned behavior model 112 may also include information related to user and/or target roles, and user and/or target interactions with the data 104. The target role may be defined by the user. The behavior learner 110 may be designated as a behavior hardware learner 110 that includes a hardware processing circuit, to execute the methods, functions and other processes described herein, or alternatively, the behavior learner 110 may be executed by at least one hardware processor (e.g., the processor 1602 of FIG. 16 and/or the processor 1804 of FIG. 18).

A visualization recommender 114 may map behaviors and features for a new set of the data 104 against the learned behavior model 112, suggest results (e.g., a visualization 118 or a plurality of visualizations 118), provide guidance (e.g., guided automated/algorithmic intuition), and obtain user feedback. The visualization recommender 114 may be designated as a visualization hardware recommender 114 that includes a hardware processing circuit, to execute the methods, functions and other processes described herein, or alternatively, the visualization recommender 114 may be executed by at least one hardware processor (e.g., the processor 1602 of FIG. 16 and/or the processor 1804 of FIG. 18).

A results generator 116 may publish, document, and codify workflow, for example, as the visualization 118. The results generator 116 may be designated as a results hardware generator 116 that includes a hardware processing circuit, to execute the methods, functions and other processes described herein, or alternatively, the results generator 116 may be executed by at least one hardware processor (e.g., the processor 1602 of FIG. 16 and/or the processor 1804 of FIG. 18).

A device controller 120 may control a device 122 (or operations associated with the device 122) based on the visualization 118. For example, the visualization 118 may be queried to authenticate, and/or otherwise used to thus control the device 122 such as an automatic teller machine (ATM). Based on feedback from the device 122 (e.g., a confirmed authentication, etc.), the device controller 120 may further control operation of the device 122, and/or other associated devices. The device controller 120 may be designated as a device hardware controller 120 that includes a hardware processing circuit, to execute the methods, functions and other processes described herein, or alternatively, the device controller 120 may be executed by at least one hardware processor (e.g., the processor 1602 of FIG. 16 and/or the processor 1804 of FIG. 18).

According to an example, a data anomaly analyzer 124 may access data 104 that is to be analyzed for an anomaly. The data 104 may include log file data. The data anomaly analyzer 124 may determine, based on the transformation and enrichment of the data 104, and the determination of the features, the determination of user role and/or the user interaction (and/or the target role and/or the target interaction), and the learning of the behavior of the user (and/or target), whether the data 104 includes the anomaly. In response to a determination that the data 104 includes the anomaly, the device controller 120 may control the device 122 associated with the data 104. The device 122 may include a device that supplies the data 104, or a device that does not supply the data 104, but is controlled by the device controller 120. The device 122 may include any type of device including a processor capable of executing machine-readable instructions to perform one or more operations. Alternatively or additionally, a firewall associated with the data 104 and/or the device 122 may be controlled to place a network in a secure mode. The data anomaly analyzer 124 may be designated as a data anomaly hardware analyzer 124 that includes a hardware processing circuit, to execute the methods, functions and other processes described herein, or alternatively, the data anomaly analyzer 124 may be executed by at least one hardware processor (e.g., the processor 1602 of FIG. 16 and/or the processor 1804 of FIG. 18).

Figure 2:
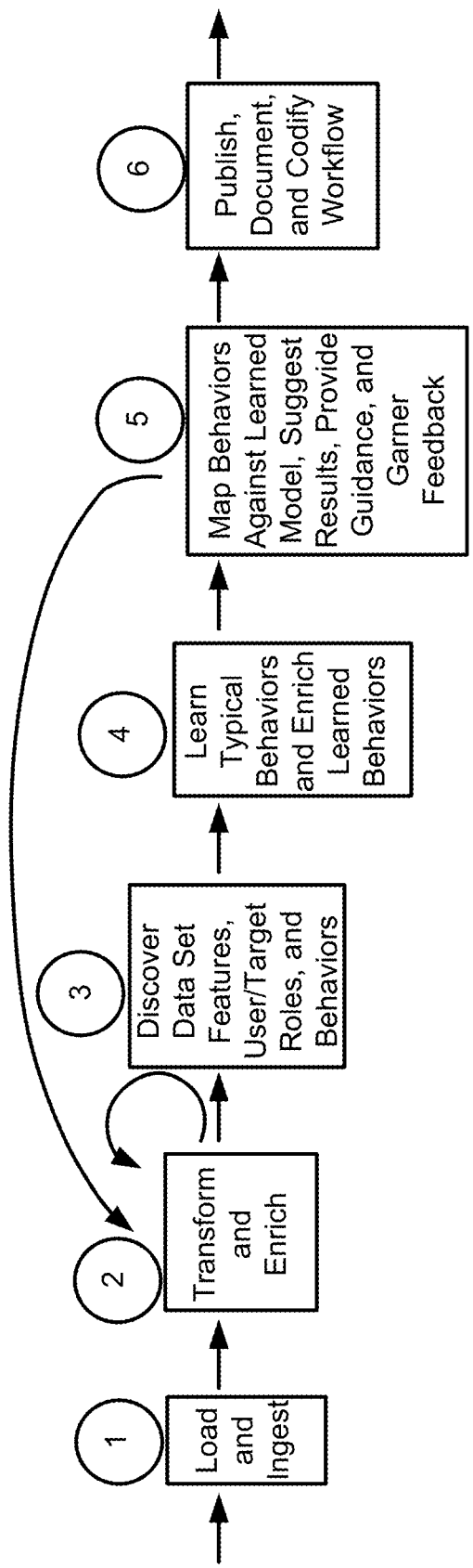
FIG. 2 illustrates a logic flow for the intelligent visualization munging system of FIG. 1, according to an example of the present disclosure.

FIG. 2 illustrates a logic flow for the system 100, according to an example of the present disclosure.

Referring to FIG. 2, at location #1, the data loader 102 may load and ingest the data 104. For example, the data loader 102 may load and ingest security log traces (e.g., 114.135.67.66,,,,583064f457f9de54307835f738ab09c67 1e596dd5db6b40b0d3a9e102e256bee, 3ZUB5Zj8BABCAA7H4FDTC+Q).

At location #2, the data iterator 106 may transform and enrich the data 104. For example, the data iterator 106 may munge results, extract information, and perform merges (i.e., iterative approach while trying to understand the data 104). For example, the transformed and enriched security log traces may be specified as: foobar.com+114.135.67.66,,,, 583064f457f9de54307835F738ab09c671e596dd5db6b40 b0d3a9e102e256bee,3ZUB5Zj8BABCAA7H4FDTC+ Q=,,,20 Feb. 2014 22:59:09 EST,Low,US/Eastern,-18000000,,,,,,,,,superagent_ng,5.2.5.6403.0, etc. In this example, the internet protocol (IP) address "foobar.com" may be merged with the ingested data from location #1. According to another example, assuming that the data 104 includes states and cities separated by a comma, a transformation may include removal of the comma, and separation of the state and city information. The state information may be discovered, for example, based on an analysis of patterns of state abbreviations. With respect to enrichment of the data 104, assuming that the data includes state and zip code information, the zip code information may be used to enrich the data 104 by determining city information, or otherwise completing any missing city information.

At location #3, the data feature and role discoverer 108 may determine data set features, user/target roles and behaviors, and implement enrichment of the data set features, and user/target roles and behaviors. In this regard, the data feature and role discoverer 108 may learn of any operations performed (i.e., data enrichment with anomalous behavior scores). As disclosed herein, the features may be described, for example, as a type of the data 104. For example, a feature of a set of the data 104 may include numerical data, textual data, graphical data, and/or location data, etc. For example, for the security log traces, the data feature and role discoverer 108 may learn of any operations performed as: Highly_Anomalous, 1, 0.00014]...[114.135.67.66,,,, 583064f457f9de54307835f738ab09c671e596dd5db6b40 b0d3a9e102e256bee,3ZUB5Zj8BABCAA7H4FDTC+ Q=,,,20 Feb. 2014 22:59:09 EST,Low,US/Eastern,-18000000,,,,,,,,,superagent_ng,5.2.5.6403.0, etc. The "Highly_Anomalous" may represent an enrichment performed on the data, indicating that the data is highly anomalous. The user may be described as a person or entity that is currently using or is otherwise associated with the ascertained data 104. The target may be described as a person or entity that is to use or is otherwise associated with the visualization 118.

At location #4, the behavior learner 110 may learn typical behaviors, and enrich learned behaviors. In this regard, from previous learned behavior, data set features/type, and the role of a user, a set of directed graph visualizations may be recommended based on data enrichment.

At location #5, the visualization recommender 114 may map behaviors against a learned behavior model, suggest results, provide guidance (e.g., guided automated/algorithmic intuition), and obtain feedback. In this regard, the visualization recommender 114 may generate a recommendation of a directed graph visualization (or a set of visualizations), which may be selected by a user.

At location #6, the results generator 116 may publish, document, and codify workflow. In this regard, the results generator 116 may produce a rich, searchable industrialized visualization (e.g., D3, sigma.js, etc.) enabled interface with munging and staging scripts. For example, FIGS. 3 and 4 illustrate user interface displays for visualization for the system 100, according to an example of the present disclosure.

Figure 3:
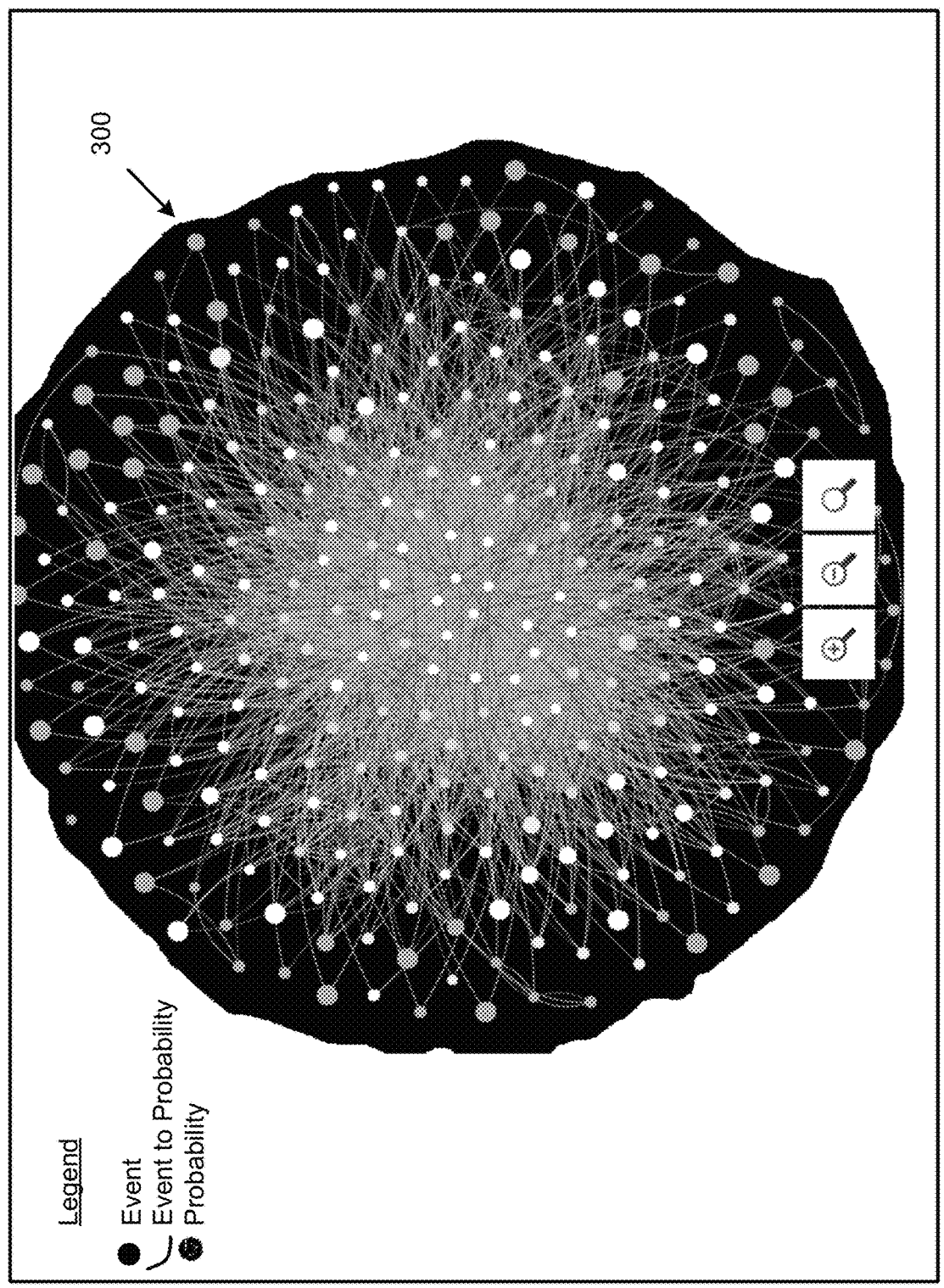
FIG. 3 illustrates a user interface display for visualization for the intelligent visualization munging system of FIG. 1, according to an example of the present disclosure.

For example, referring to FIG. 3, with respect to network security events based on the data 104 that includes several months (e.g., three petabyte) of security data, the results generator 116 may generate graphs with nodes representing events, edges connecting events that are related to each other, the size representing the anomalousness (i.e., very high probability of anomalousness events being displayed on the outer bounds as shown in FIG. 3 at 300, to very-low probability of anomalousness events being displayed towards the middle), and different colors (e.g., red, yellow, orange, etc.) representing the probability of occurrence of the events.

Figure 4:
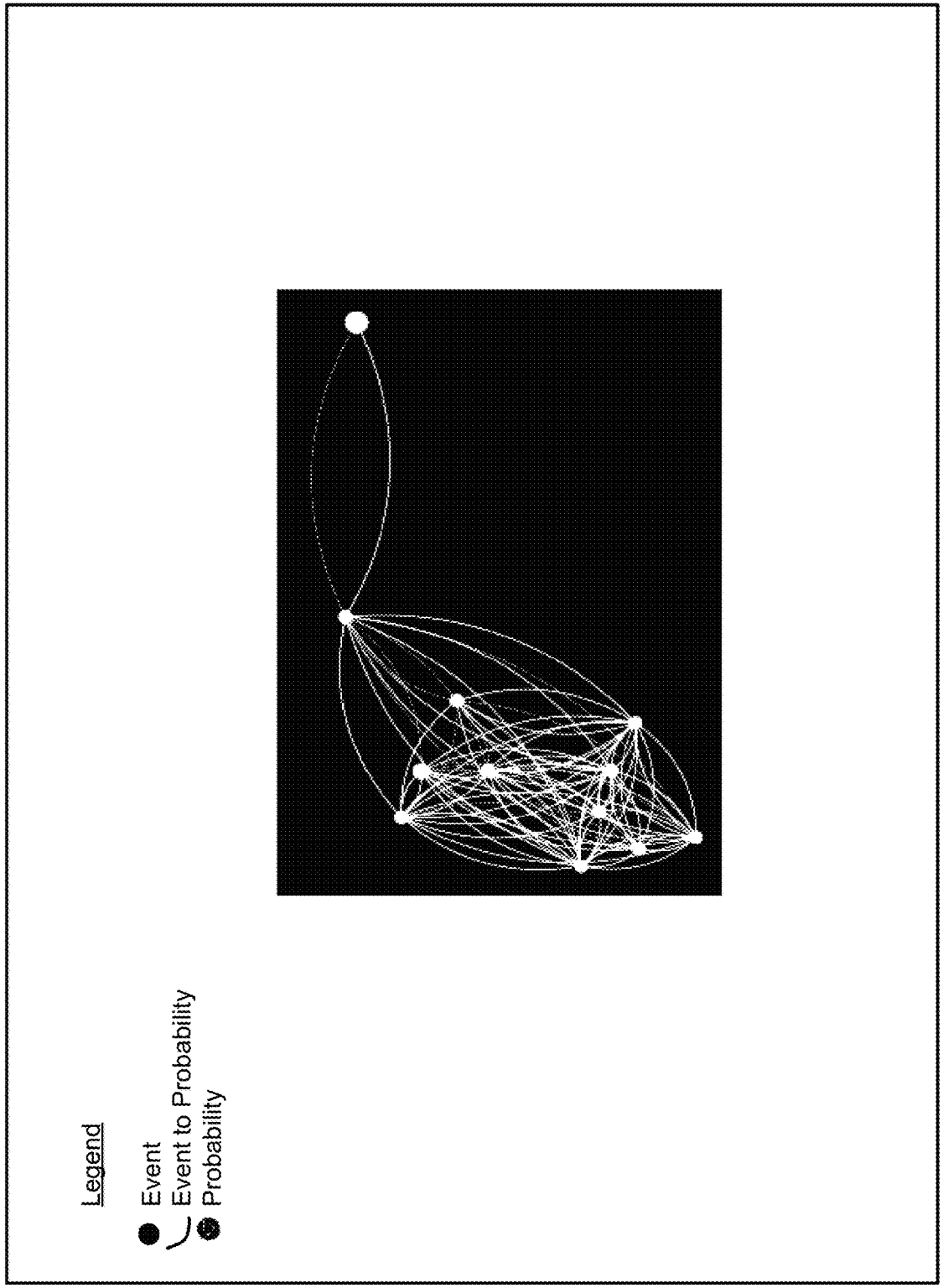
FIG. 4 illustrates a user interface display for visualization for the intelligent visualization munging system of FIG. 1, according to an example of the present disclosure.

Referring to FIG. 4, an analyst may drill down into the graph of FIG. 3 to explore preceding and succeeding events for any given event. A particular event (i.e., node) of the display of FIG. 3 may be selected to generate the specific events related to the particular node as shown in FIG. 4.

With respect to inputs to and outputs of the system 100, the inputs to the system 100 may include existing transaction graphs, the learned behavior model 112, action sequence (operations, transformations), analytic operations, dataset features (metadata: # records, # attributes, nominal/ordinal/interval/ratio, quality, data types, noise, etc.), user roles, target roles, and/or target feedback. Further, the outputs of the system 100 may include recommendations, results, reinforcement (e.g., recommended interactive visualization(s), transaction graph (feedback loop), target rating/confidence, etc.), and publishing (e.g., staging such as interactive visualization, documentation such as workflow transaction documentation, workflow codification such as codified transformations scripts, codified staging scripts, etc.).

Figure 5:
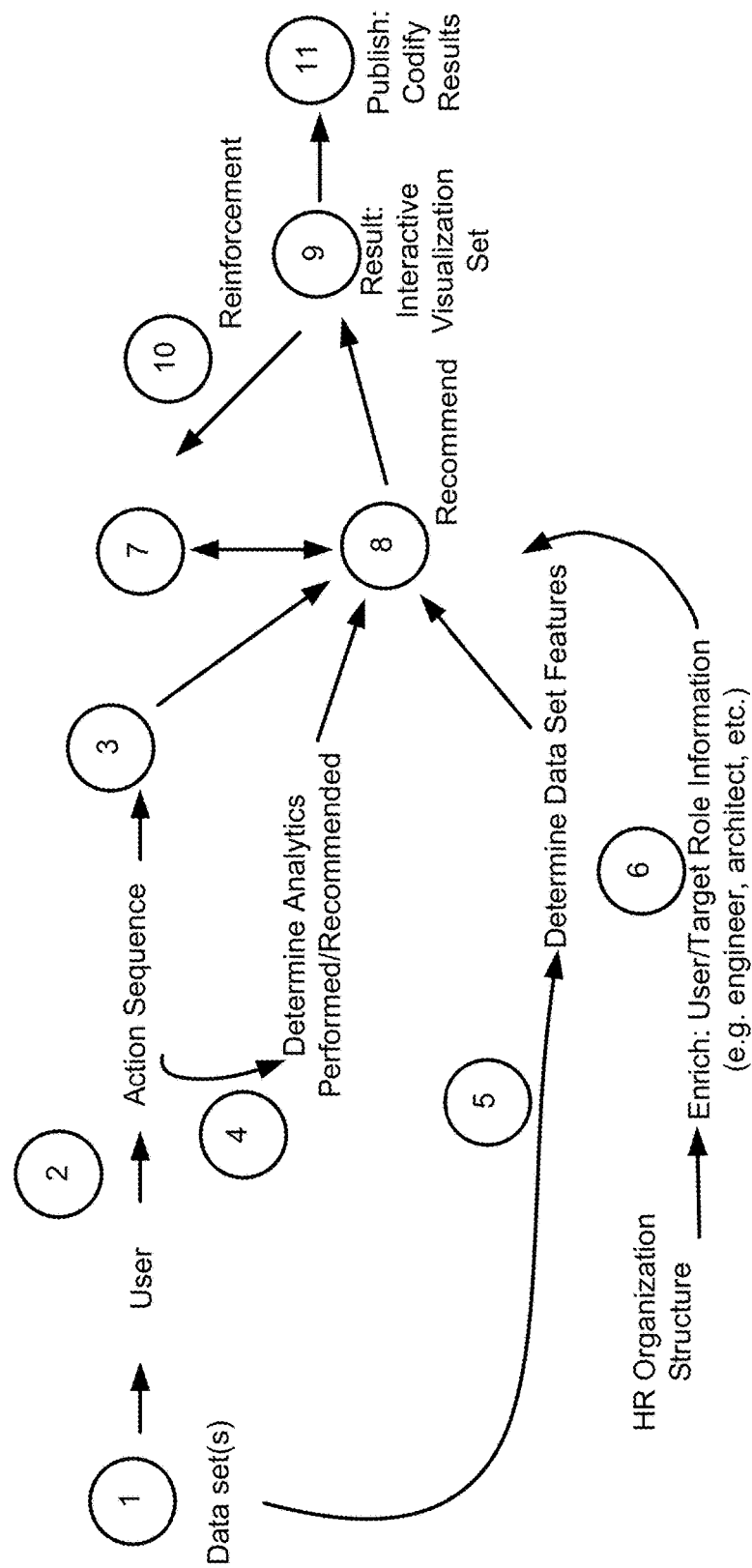
FIG. 5 illustrates further details of the logic flow for the intelligent visualization munging system of FIG. 1, according to an example of the present disclosure.

FIG. 5 illustrates further details of the logic flow for the system 100, according to an example of the present disclosure.

Referring to FIG. 5, at location #1 (corresponding to location #1 of FIG. 2), the data loader 102 may load and ingest the data 104, where a user may select a data set as a part of a process.

At location #2 of FIG. 5 (corresponding to location #2 of FIG. 2), user sequence of actions and behaviors may be tracked (i.e., monitored). Further, at location #2 of FIG. 5, the data iterator 106 may transform and enrich the data 104.

At location #3 of FIG. 5 (corresponding to location #3 of FIG. 2), the data feature and role discoverer 108 may determine data set features, user/target roles and behaviors, and implement enrichment of the data set features, and user/target roles and behaviors. In this regard, at location #3 of FIG. 5, the data feature and role discoverer 108 may extract behavior patterns. At location #4 of FIG. 5, the data feature and role discoverer 108 may determine analytics that are performed on the data 104. At location #5 of FIG. 5, the data feature and role discoverer 108 may determine and summarize metadata features describing the utilized datasets. Further, at location #6 of FIG. 5, roles of both the user and target may be determined from available organizational charts as a part of a data enrichment process.

At location #7 of FIG. 5 (corresponding to location #4 of FIG. 2), the behavior learner 110 may learn typical behaviors, and enrich learned behaviors. In this regard, behaviors that evolve over time, data features, user roles, processes and transforms may be aggregated, learned, and correlated into the learned behavior model 112.

At location #8 of FIG. 5 (corresponding to location #5 of FIG. 2), the visualization recommender 114 may map behaviors against the learned behavior model 112, suggest results, provide guidance (e.g., guided automated/algorithmic intuition), and obtain feedback. In this regard, the visualization recommender 114 may utilize the learned behavior model 112 (as produced through a feedback loop), incoming behaviors, and features to recommend an output.

At location #9 of FIG. 5, the results generator 116 may produce a set of interactive visualizations based, for example, on the roles of both targets and users.

At location #10 of FIG. 5, feedback may be sent back to the learned behavior model, for example, to provide dynamic and continual reinforcement or supervised learning.

At location #11 of FIG. 5 (corresponding to location #6 of FIG. 2), the results generator 116 may publish, document, and codify the workflow with reports, load/transformation/mapping/filtering scripts, and staging scripts.

Figure 6:
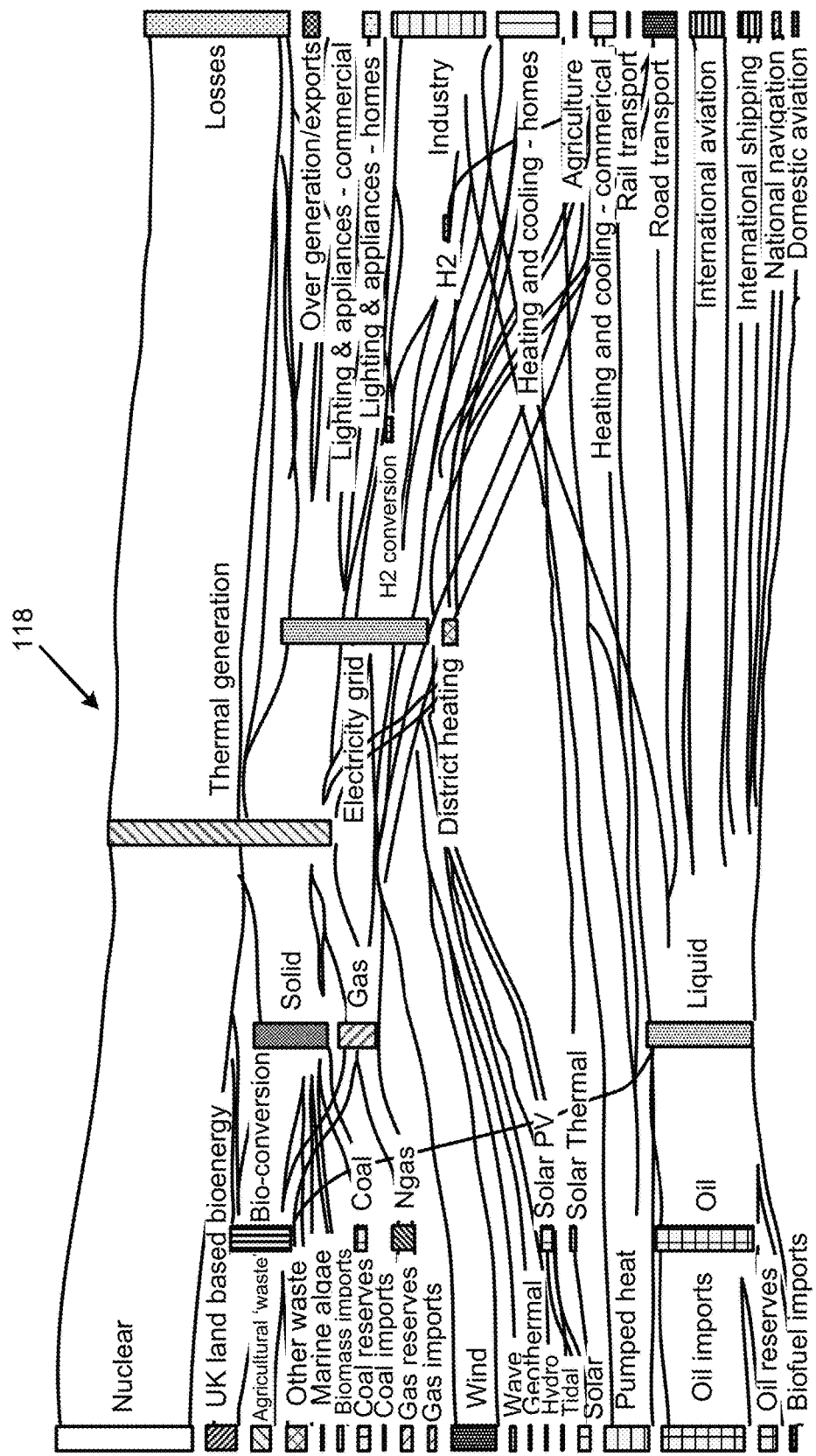
FIG. 6 illustrates an output visualization for the intelligent visualization munging system of FIG. 1, according to an example of the present disclosure.

FIG. 6 illustrates an output visualization for the system 100, according to an example of the present disclosure.

For the example of FIG. 6, for a use case related to the system 100, a user may have a large set of the data 104 (e.g., data representing customers for an electrical company and the source of consumed energy). The user may need to understand the data 104, perform analytics on the data 104, and visualize the results of the analytics in a meaningful way that communicates the interconnections and magnitude of consumption, and what industries/appliances are consuming the most energy. In order to visualize the results in a meaningful way, the data 104 may be ingested by the data loader 102, and the process of data ingestion, the source, and location may be captured as a part of a list of actions. A user may perform a set of extract, transform, and load (ETL) actions, and code/API interactions in an application in development. The user may manipulate the data 104 and perform operations such as mapping and joining of information with an existing ontology. These actions may be captured and extracted in the action set as regular behaviors. As a part of the user's job, the user may perform aggregation analytics and filtering (e.g., data cleaning) of the data to an existing ontology. These analytic operations may be discovered within the action set and recorded. The data set (e.g., the energy information) may be sampled, and metadata and statistics may be discovered that characterize the data set. Along with all the other information already captured, the user's role as a software engineer may be known as the user's credentials, and are associated with the user's code submission. Additionally, the user may provide information about the target of visualizations to improve results for increased tailoring. If present, the learned behavior model 112 and feature sets may be used for recommendations. If a previous learned behavior model 112 does not exist, then the current features may be learned for future reference. Current features of the user, the user's data set, and the user's actions may be validated against a memory of what others with similar roles have performed. A relatively small set of interactive visualizations may be offered as a way to represent the data and actions performed from which the user may use and publish. Feedback may be garnered from the user (or other users) as to applicability of recommendations to improve and reinforce future recommendations by the visualization recommender 114.

Figure 7:
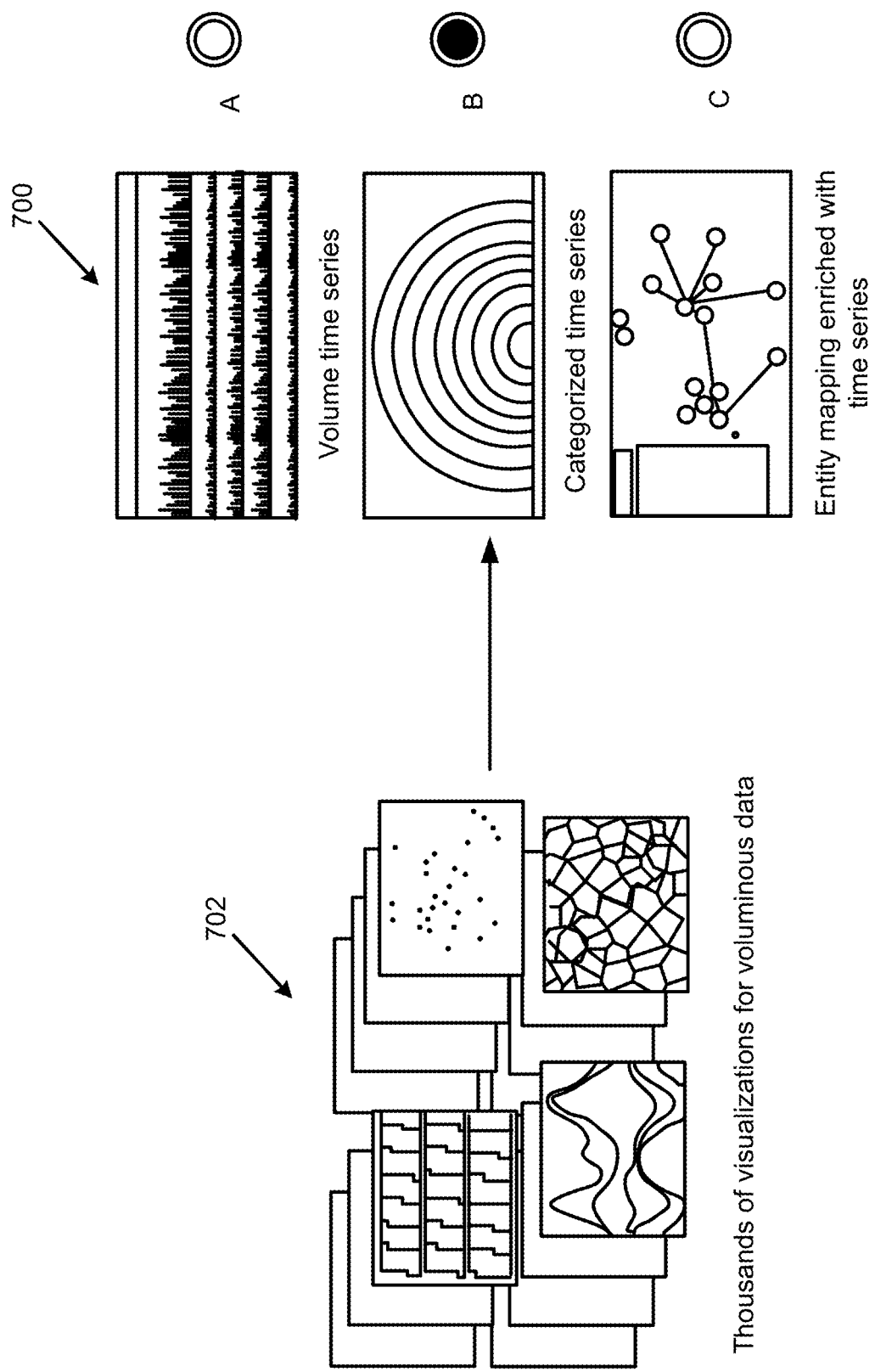
FIG. 7 illustrates security data visualization for the intelligent visualization munging system of FIG. 1, according to an example of the present disclosure.

FIG. 7 illustrates security data visualization for the system 100, according to an example of the present disclosure.

Referring to FIG. 7, the visualization recommender 114 may map behaviors and features for a new set of the data 104 against the learned behavior model 112, and generate a recommendation of visualizations (e.g., at 700), from a plurality of available visualizations at 702. A user of the system 100 may select one of the recommended visualizations (e.g., the "categorized time series"). The selection by the user may be ascertained as a user behavior by the behavior learner 110 for further enrichment of the learned behavior model 112.

Figure 8:
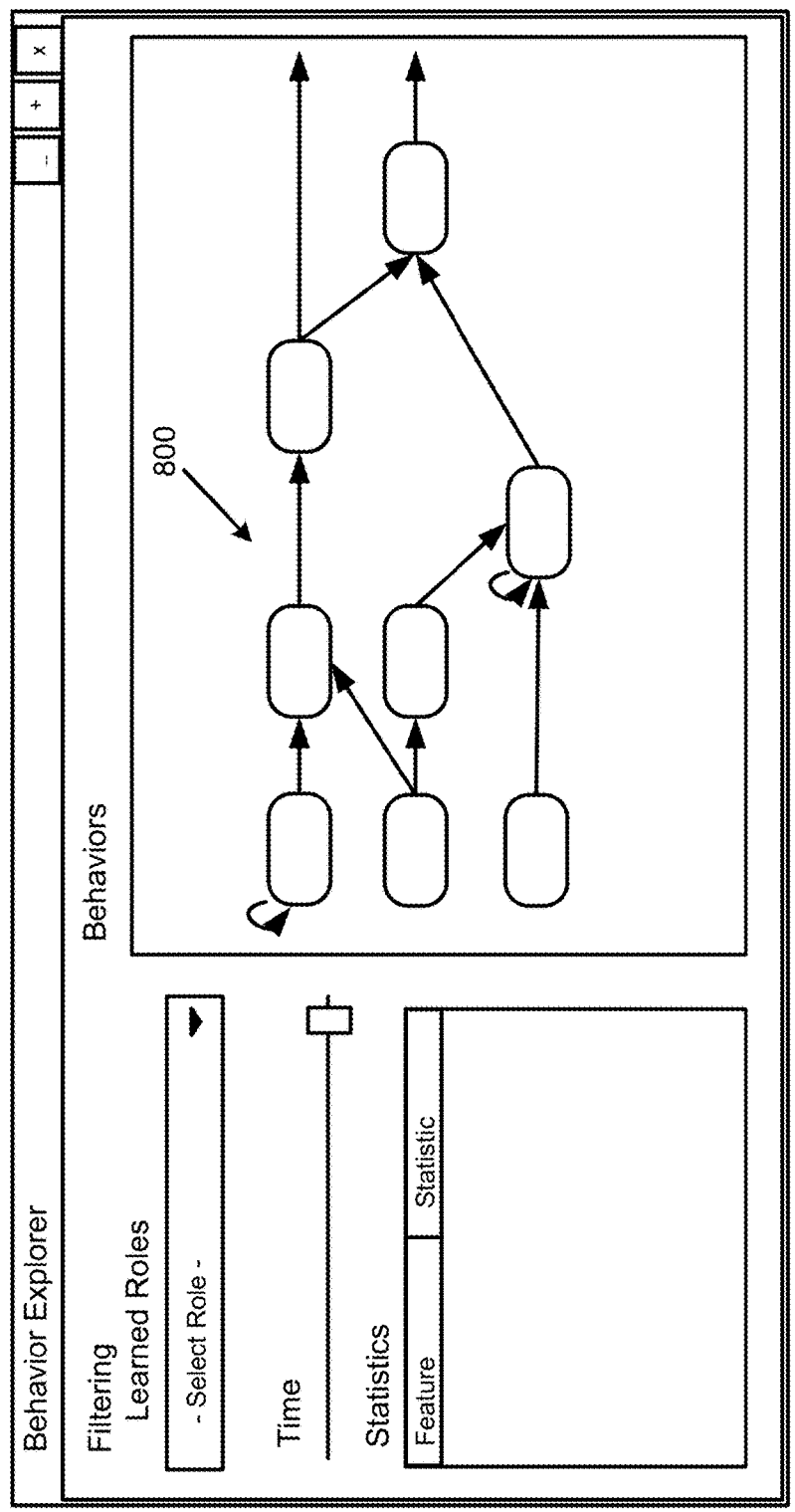
FIG. 8 illustrates behavior extraction for the intelligent visualization munging system of FIG. 1, according to an example of the present disclosure.
Figure 9:
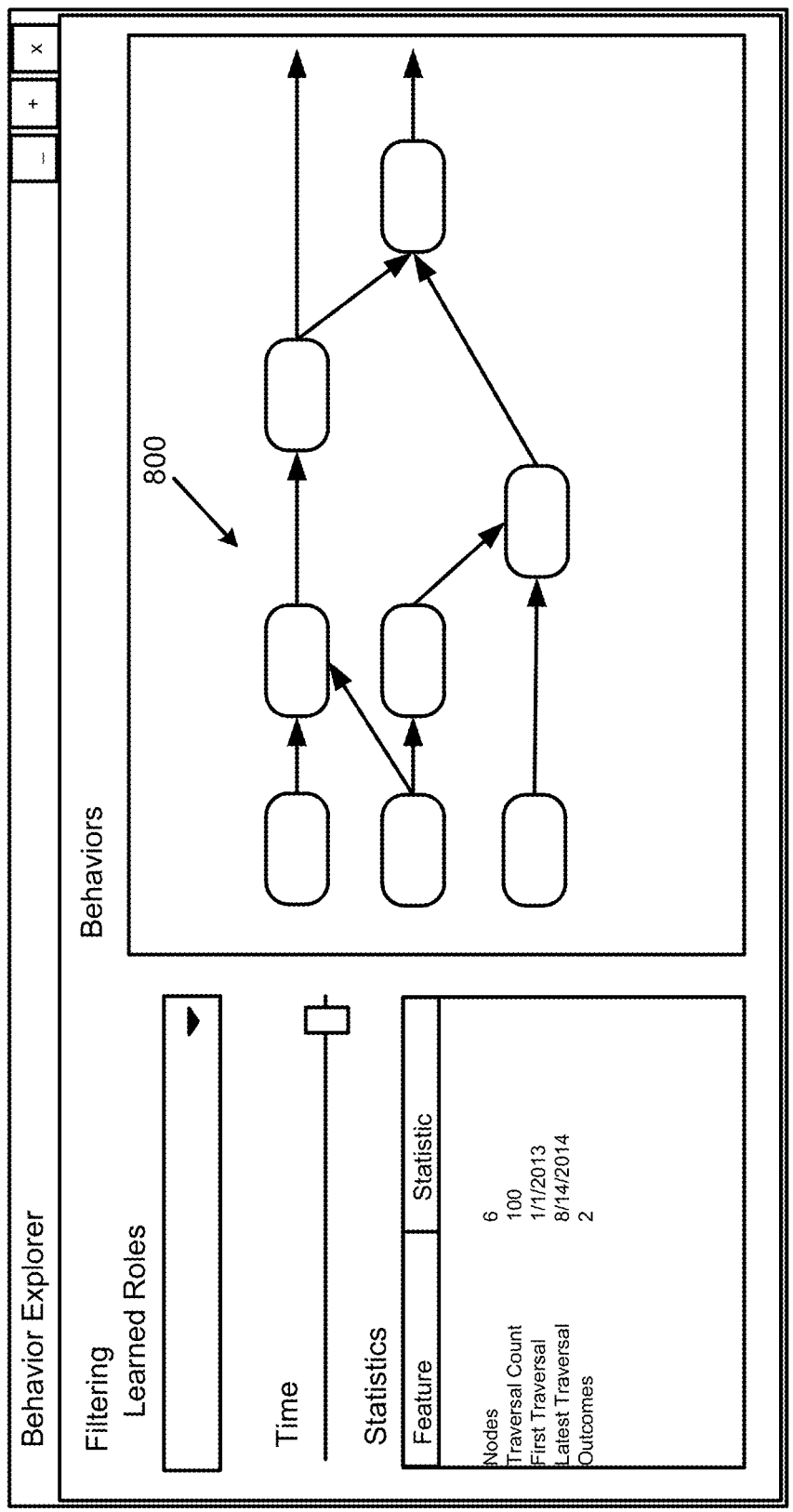
FIG. 9 illustrates behavior extraction for the intelligent visualization munging system of FIG. 1, according to an example of the present disclosure.

FIG. 8 illustrates behavior extraction for the system 100, according to an example of the present disclosure. FIG. 9 illustrates behavior extraction for the system 100, according to an example of the present disclosure.

Referring to FIGS. 8 and 9, a behavior of a user may be mapped and ascertained as shown at 800 as the user performs various operations on the data 104. For example, each block at 800 may represent a different operation (e.g., a split, merge, etc.), performed on the data 104.

Referring to FIGS. 1, 2, 5, and 7-9, with respect to an example related to security data visualization, the data 104 (which represents a relatively large data set) may be acquired by a user (e.g., an information technology (IT) manager). The data 104 may include data representing traces of security events across an enterprise, where each trace is a part of a relatively long sequence of events and is categorized, for example, by user, geographic location, source, target, and event.

Referring to FIGS. 1, 2, 5, and 7-9, for the example related to security data visualization, at location #1 of FIG. 5, the user (e.g., the IT manager) may login into the system 100, and upload, via the data loader 102, the security data. In this regard, the data feature and role discoverer 108 may determine the user role, for example, as an IT manager.

Referring to FIGS. 1, 2, 5, and 7-9, for the example related to security data visualization, at location #2 of FIG. 5, with respect to monitoring, the data feature and role discoverer 108 may monitor the behavior of the user. For example, the data feature and role discoverer 108 may monitor a user performing field division to divide the data 104 into its respective fields. Alternatively or additionally, the user may identify and merge event fields to generate a compound event comprising, for example, of the device name and event from which a trace originated and the trace describes. Alternatively or additionally, the user may identify and obfuscate user, location, and target fields in the data 104. Alternatively or additionally, the user may identify multiple timestamps fields, where one timestamp field may be selected as relevant, and field values for the selected field may be transformed into coordinated universal time (UTC). Alternatively or additionally, the user may perform a join operation between the security data and a data set classifying events according to an anomaly score.

Referring to FIGS. 1, 2, 5, and 7-9, for the example related to security data visualization, at location #3 of FIG. 5, with respect to discovery, the data feature and role discoverer 108 may determine data set features, user/target roles and behaviors, and implement enrichment of the data set features, and user/target roles and behaviors. For example, the data feature and role discoverer 108 may extract and organize all actions related to location #2 of FIG. 5 as an ordered set of behaviors. Further, the data feature and role discoverer 108 may categorize all actions related to location #2 of FIG. 5. The data feature and role discoverer 108 may perform operations on the data 104 to extract a sequence of events with respect to user, location, source, etc., where the operations may include ingesting, cleaning, transforming, filtering, etc. The data feature and role discoverer 108 may present information in a consumable format (where the best visualization for exploring may be unknown).

Referring to FIGS. 1, 2, 5, and 7-9, for the example related to security data visualization, at location #4 of FIG. 5, with respect to discovery, the data feature and role discoverer 108 may filter all actions related to location #3 of FIG. 5 on analytic categories, and extract the filtered actions. Further, obfuscation, which is determined to be a type of analytical operation, may be recorded by the data feature and role discoverer 108 as a feature of the behavior set for further analysis.

Referring to FIGS. 1, 2, 5, and 7-9, for the example related to security data visualization, at location #5 of FIG. 5, with respect to discovery, the data feature and role discoverer 108 may mine metadata features of the transformed data set, and classify the metadata features. With respect to classification, the data feature and role discoverer 108 may classify Internet Protocol (IP) as source IP, target IP, and discover relationships between all source and target IPs (i.e., one-to-m relationship) based on application of the multinomial logistic regression as disclosed herein. With respect to classification, the data feature and role discoverer 108 may discover users/roles, and the one-to-one relationship with user and IP. With respect to classification, the data feature and role discoverer 108 may determine timestamp data. With respect to classification, the data feature and role discoverer 108 may classify events as nominal data. With respect to classification, the data feature and role discoverer 108 may classify anomaly scores as ordinal data, where the anomaly scores are determined to have a 1-m relationship with events. The ordinal data may represent a statistical data type including numerical scores that exist on an ordinal scale, that is, an arbitrary numerical scale where the exact numerical quantity of a particular value has no significance beyond its ability to establish a ranking over a set of data points. With respect to classification, the data feature and role discoverer 108 may extract rules for showing a high likelihood of co-occurrence between discrete set of anomaly scores (e.g., 1~5) with certain IP's. With respect to the example related to security data visualization, the data feature and role discoverer 108 may discover all of the data set features to align with known security data set features (for example, use of "high risk" in field values, field names of "target" and "attacker", etc.)).

Referring to FIGS. 1, 2, 5, and 7-9, for the example related to security data visualization, at location #6 of FIG. 5, with respect to enrichment, the data feature and role discoverer 108 may retrieve user information from existing human resource (HR) hierarchy maps to extract a user role as found in the data set, and perform a join if possible (i.e., check of existing data mappings are found with this data set and other known sets). For example, user "bdobbs" is found in data set under user field, mapping back through an organization in an HR data set, "bdobbs" is found to be a part of information technology (IT), thus the data feature and role discoverer 108 may classify "bdobbs" as a "Support Technician". The data feature and role discoverer 108 may also extract and save munging user information as a feature of the behavior set, and save this information for further use (i.e., user role IT manager may be extracted from a HR hierarchy tree).

Referring to FIGS. 1, 2, 5, and 7-9, for the example related to security data visualization, at location #7 of FIG. 5, with respect to learning, the behavior learner 110 may learn typical behaviors, and enrich learned behaviors. For example, the behavior learner 110 may merge a behavior sequence with previous learned sequences for the learned behavior model 112. The behavior learner 110 may capture likelihood statistics. Further, the behavior learner 110 may categorize behavior according to roles, and enrich the learned behavior model 112 with behavior categories to create a larger learned behavior model 112 that may be used as a recommender or classifier based on the features.

Referring to FIGS. 1, 2, 5, and 7-9, for the example related to security data visualization, at location #8 of FIG. 5, with respect to recommendation, the visualization recommender 114 may map behaviors against the learned behavior model 112, suggest results, provide guidance (e.g., guided automated/algorithmic intuition), and obtain feedback. For example, at the outset, if no learned behavior model 112 exists (i.e., the learned behavior model 112 does not include data with respect to features, user roles, behavior, etc.), the visualization recommender 114 may learn information for comparison at a later time. If a memory model of actions exists (i.e., the learned behavior model 112 includes data with respect to different features, user roles, behaviors, etc.), then based on this information, the visualization recommender 114 may apply multinomial logistic regression to the learned behavior model 112 and the data 104 under consideration to recommend a result. The information used for recommendation may include, for example, current tool user roles, current behavior set, current analytics performed, current data set features, current data set roles/targets (if known), etc. For example, the current tool user role may be specified as an IT manager, the behavior sequence may include field division, field merging, field identification, and data joins, the analytics performed may include obfuscation, and the data set features may include IP's 1-m relationship, anomaly co-occurrence, etc. Based on previously performed actions of other IT managers utilizing similar data sets as captured by the learned behavior model 112, the visualization recommender 114 may use the learned behavior model 112 to map the information for the current data set to previous such information to recommend a "source-destination" visualization for consumption.

Referring to FIGS. 1, 2, 5, and 7-9, for the example related to security data visualization, at location #9 of FIG. 5, with respect to results, the results generator 116 may produce a set of interactive visualizations based on the roles of both targets and users. For example, the results generator 116 may generate ETL scripts of actions performed on the data set. The ETL scripts of actions performed on the data set may be generated, for example, for automation purposes. The results generator 116 may generate data staging scripts. The results generator 116 may produce a visualization based, for example, on actions performed, joining of data sets, and features previously mentioned. Using all features, roles, and captured behaviors, as shown in FIG. 7, the results generator 116 may present a relatively small set of recommendations (e.g., target/attacker, anomaly volume over time, anomaly volume per trace type, etc.).

Referring to FIGS. 1, 2, 5, and 7-9, for the example related to security data visualization, at location #10 of FIG. 5, with respect to reinforcement and model exploration, information on the chosen visualization may be recorded, learned, and categorized by the results generator 116 according to all previously discovered features. The results generator 116 may publish a final recommendation with use of automated ETL scripts and data staging scripts. The results generator 116 may learn a model of behaviors, and represent the model of behaviors as a graph of transitions which may be traversed and explored. The model may be represented as a series of event sets, roles, and a result producing a rule set. If a behavior graph is not present, then the results generator 116 may use the event set for recommendations. The results generator 116 may filter the model based on roles and targets. Models may include a combination of graphs and a rules table. The results generator 116 may track role behaviors (e.g., data set, roles, visualization feature set with consequence, as shown in FIGS. 8 and 9).

Referring to FIGS. 1, 2, 5, and 7-9, for the example related to security data visualization, at location #11 of FIG. 5, with respect to publishing, the results generator 116 may forward and publish the results to a data store for visualization querying once a final output is selected. The results generator 116 may document the workflow with a human readable report of all transactions performed. The results generator 116 may publish and codify transformation scripts encompassing field division, event field joins, analytic obfuscation, data source enrichment mappings, and field assignments, in order as they are performed. The results generator 116 may generate staging scripts for pushing results into a data store based on a selected in-memory destination.

Figure 10:
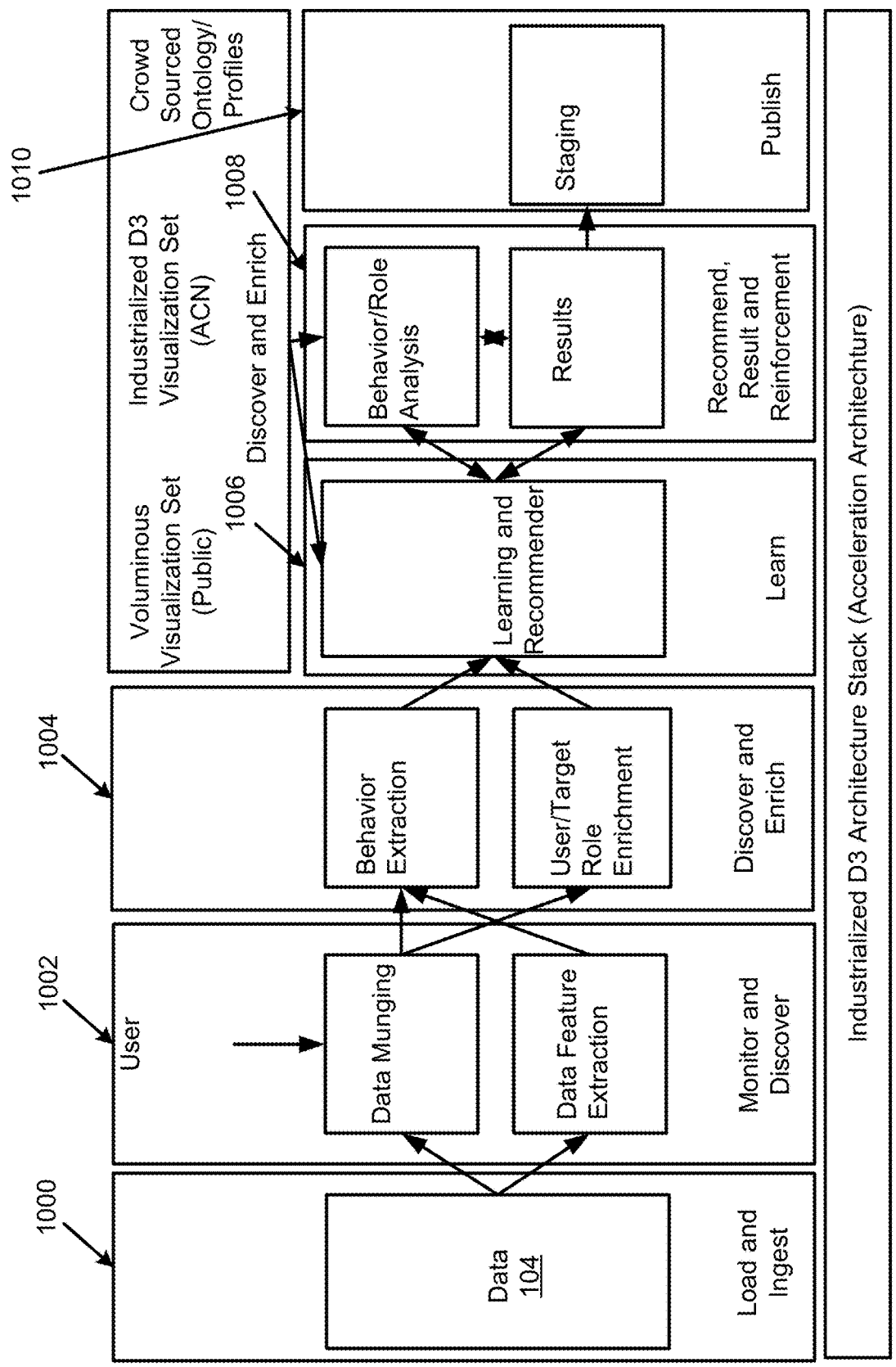
FIG. 10 illustrates an architecture overview and technology mappings for the intelligent visualization munging system of FIG. 1, according to an example of the present disclosure.
Figure 11:
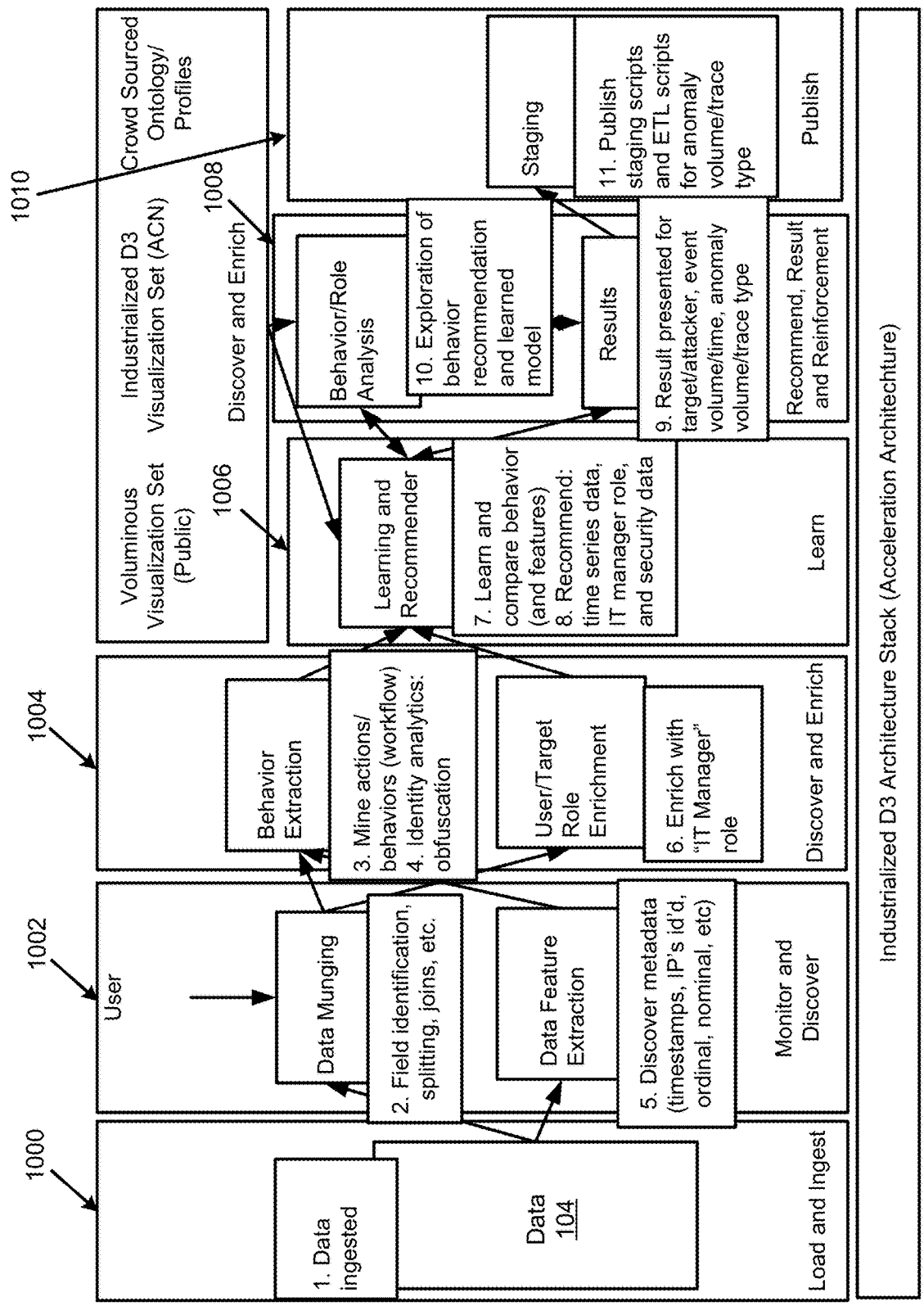
FIG. 11 illustrates an architecture overview and use case/workflow mapping for the intelligent visualization munging system of FIG. 1, according to an example of the present disclosure.

FIG. 10 illustrates an architecture overview and technology mappings for the system 100, according to an example of the present disclosure. FIG. 11 illustrates an architecture overview and use case/workflow mapping for the system 100, according to an example of the present disclosure. Referring to FIG. 11, the workflows steps for locations #1 to #11 as listed in FIG. 5 are similarly listed in FIG. 11.

Referring to FIGS. 5, 10, and 11, at 1000 (corresponding to location #1 of FIGS. 5 and 11), the data loader 102 may load and ingest the data 104 (also referred to herein as the "data set"), where a user may select a data set as a part of a process.

At 1002 (corresponding to location #2 of FIGS. 5 and 11), user sequence of actions and behaviors may be tracked (i.e., monitored). Further, at 1002, the data iterator 106 may transform and enrich the data 104. In this regard, the data iterator 106 may perform data munging and data feature extraction.

At 1004 (corresponding to location #3 of FIGS. 5 and 11), the data feature and role discoverer 108 may determine data set features, user/target roles and behaviors, and implement enrichment of the data set features, and user/target roles and behaviors. In this regard, the data feature and role discoverer 108 may extract behavior patterns. At location #4 of FIGS. 5 and 11, the data feature and role discoverer 108 may determine analytics that are performed on the data 104.

At location #6 of FIGS. 5 and 11, the data feature and role discoverer 108 may determine and summarize metadata features describing the utilized datasets. Further, at location #6 of FIGS. 5 and 11, roles of both the user and target may be determined from available organizational charts as a part of a data enrichment process.

At 1006 (corresponding to location #7 of FIGS. 5 and 11), the behavior learner 110 may learn typical behaviors, and enrich learned behaviors. In this regard, behaviors that evolve over time, data features, user roles, processes and transforms may be aggregated, learned, and correlated into the learned behavior model 112. At location #8 of FIGS. 5 and 11, the visualization recommender 114 may map behaviors against the learned behavior model 112, suggest results, provide guidance (e.g., guided automated/algorithmic intuition), and obtain feedback. In this regard, the visualization recommender 114 may utilize the learned behavior model 112 (as produced through a feedback loop), incoming behaviors, and features to recommend an output.

At 1008 (corresponding to location #9 of FIGS. 5 and 11), the results generator 116 may produce a set of interactive visualizations based on the roles of both targets and users. At location #10 of FIGS. 5 and 11, feedback may be sent back to the learned behavior model 112 to provide dynamic and continual reinforcement or supervised learning.

At 1010 (corresponding to location #11 of FIGS. 5 and 11), the results generator 116 may publish, document, and codify the workflow with reports, load/transformation/mapping/filtering scripts, and staging scripts.

Figure 12:
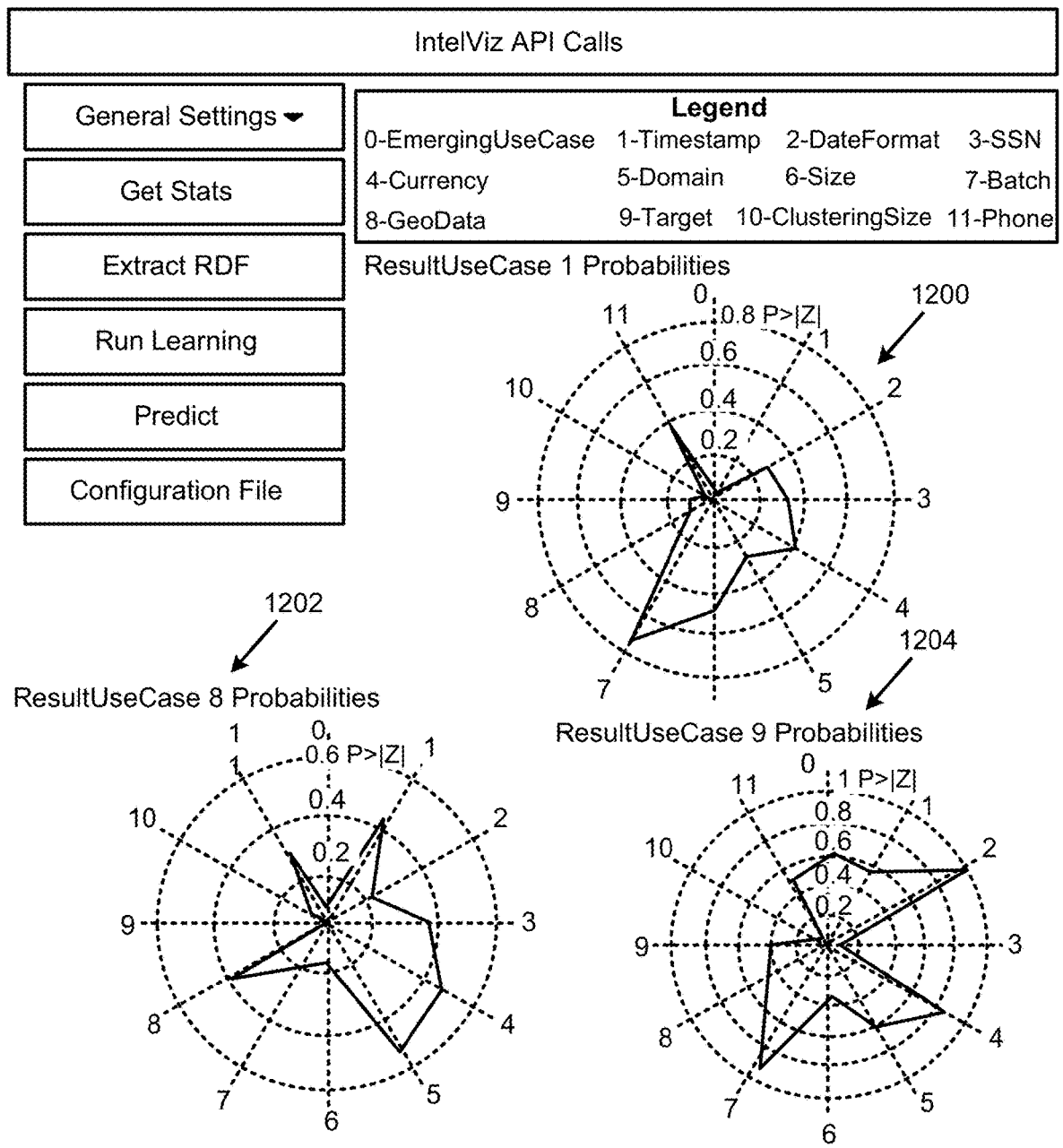
FIG. 12 illustrates influence of each feature on different use cases for the intelligent visualization munging system of FIG. 1, according to an example of the present disclosure.

FIG. 12 illustrates influence of each feature on different use cases for the system 100, according to an example of the present disclosure. With respect to training of the learned behavior model 112, for FIG. 12, the features associated with the example are illustrated in the "Legend" as features 0-11 (e.g., Feature 0=Emerging Use Case, Features 1=Timestamp, etc.). For use case-1 at 1200, use case-1 is most influenced by the batch feature (e.g., as shown in the "Legend" under item #7) for the system 100, according to an example of the present disclosure. For use case-8 at 1202, use case-8 is most influenced by the domain (e.g., as shown in the "Legend" under item #5) and whether or not the data set contains currency data (e.g., as shown in the "Legend" under item #4) for the system 100, according to an example of the present disclosure. Use case-9 at 1204 is less influenced by the domain and whether or not the data set contains currency data for the system 100, according to an example of the present disclosure. Instead, use case-9 is most influenced by the date format (e.g., as shown in the "Legend" under item #2). Thus, each of the use cases are influenced differently by different features. Accordingly, assuming that a new set of the data 104 includes only features related to date format, it can be seen that use case-9, which is most influenced by the date format (e.g., as shown in the "Legend" under item #2), would be most representative of the features of the new set of the data 104. Thus, the visualizations associated with use case-9 may be recommended for the new set of the data 104. In this manner, if the new set of the data 104 includes other features, such features may be accounted for by using multinomial logistic regression with respect to the existing use cases 1, 8, and 9, to determine a recommendation (e.g., one or more of the use cases) for visualizations for the new set of the data 104. FIG. 12 thus provides a visual representation of the system 100, illustrating how each feature influences the probability of providing a recommendation of a particular use case.

According to examples, the system 100 may analyze individual visualizations, and also groups of visualizations or use cases.

Figure 13:
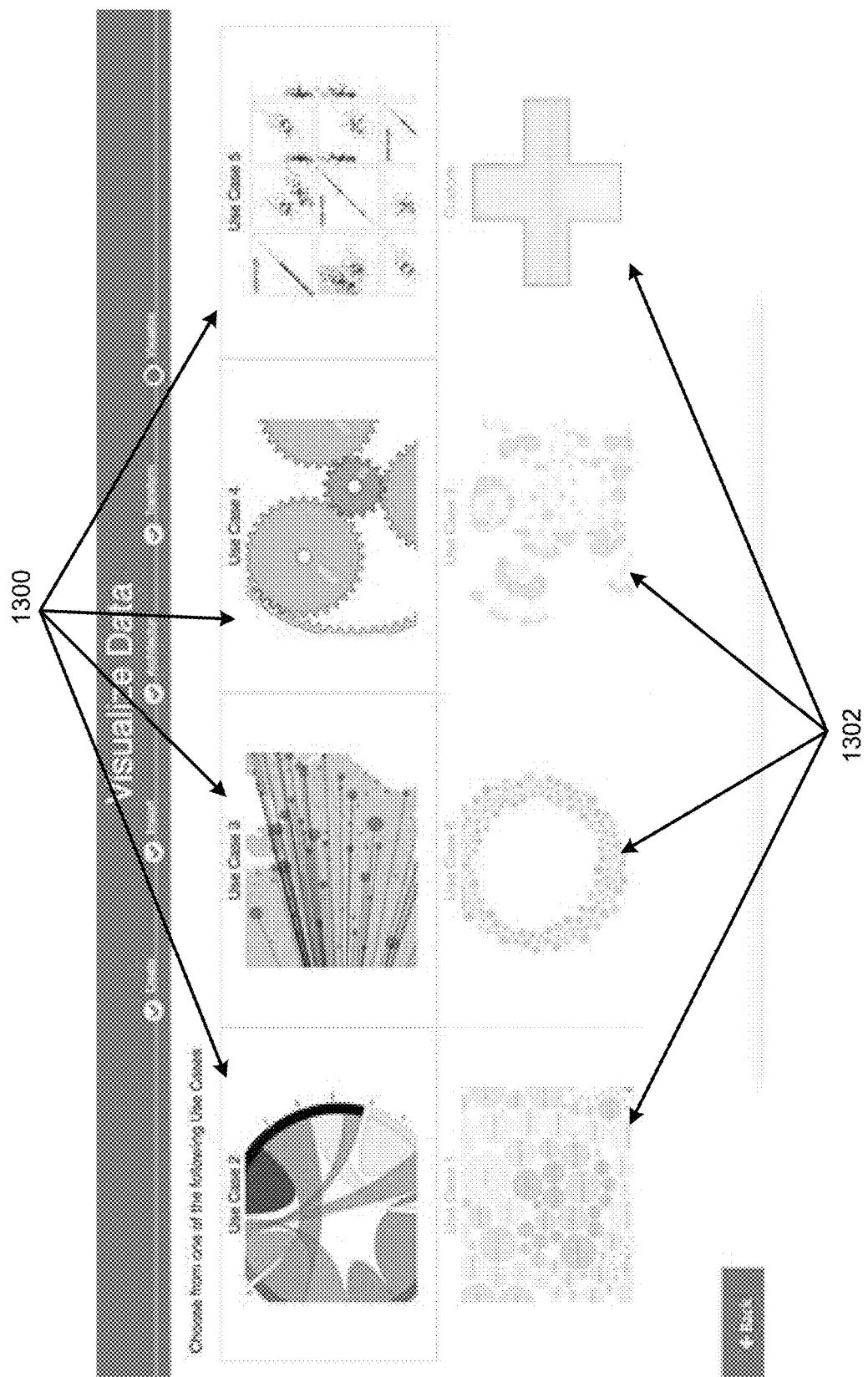
FIG. 13 illustrates display of use cases with recommended use cases highlighted for the intelligent visualization munging system of FIG. 1, according to an example of the present disclosure.

FIG. 13 illustrates display of use cases with recommended use cases highlighted for the system 100, according to an example of the present disclosure.

Referring to FIG. 13, after the data munging process, a user may be presented with the available use cases. The recommended use cases may be highlighted (e.g., use cases 2-5) at 1300, for example, to encourage a user to follow pre-established best practices. The non-recommended, or other lower-priority recommendation use cases may be presented at 1302. However, if a user disagrees with use of the recommended use cases, a different use case selection may be made.

Figure 14:
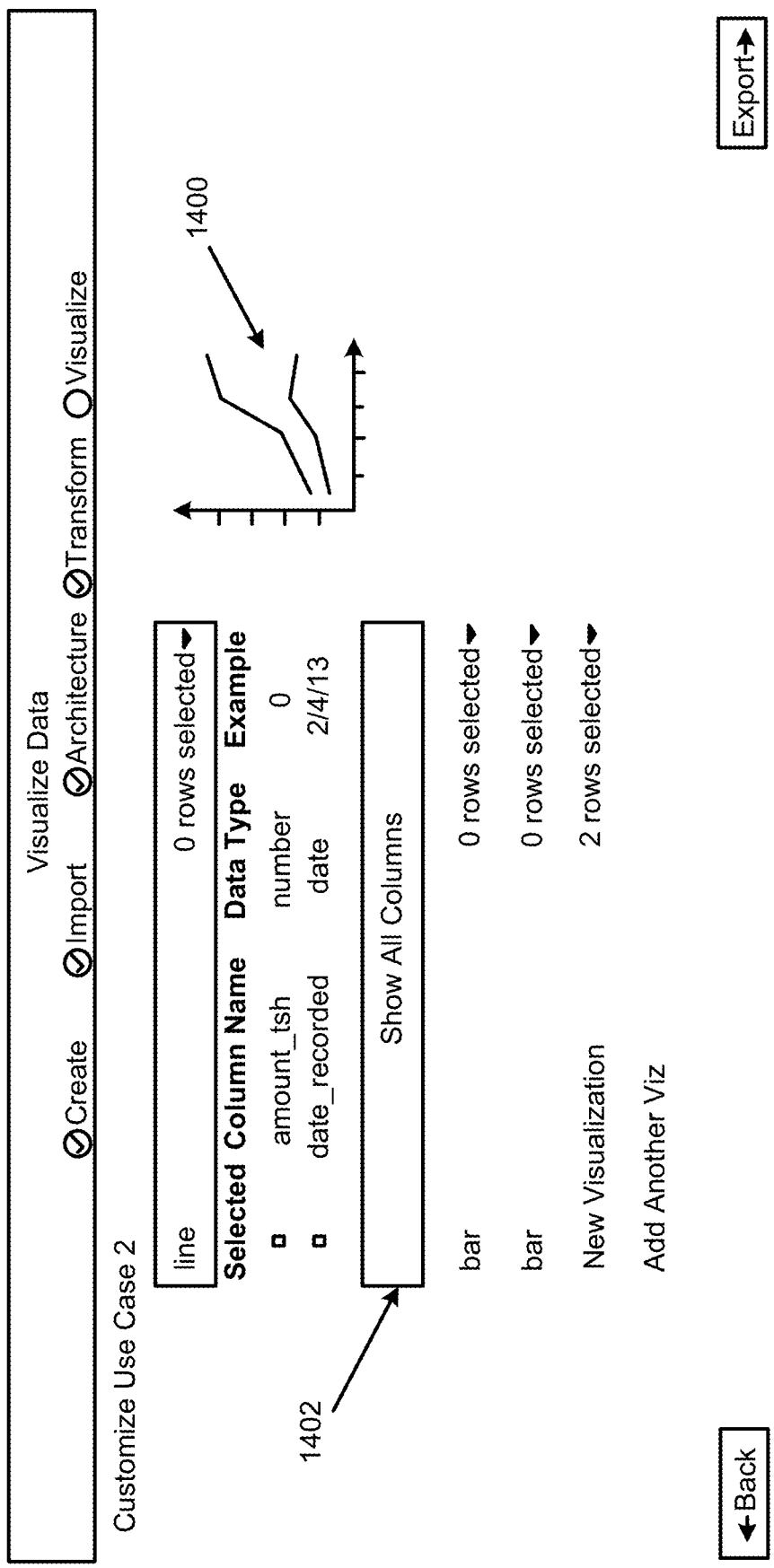
FIG. 14 illustrates column selection for visualization customization for the intelligent visualization munging system of FIG. 1, according to an example of the present disclosure.

FIG. 14 illustrates column selection for visualization customization for the system 100, according to an example of the present disclosure.

Referring to FIG. 14, after selecting a use case, a prompt may be generated for the user to customize the individual charts (e.g., at 1400) included in the use case. For example, as shown in FIG. 14, the columns appropriate for the charts being edited may be provided as suggestions to users. However, a user may select all columns by selecting the "show all columns" option at 1402.

Figure 15:
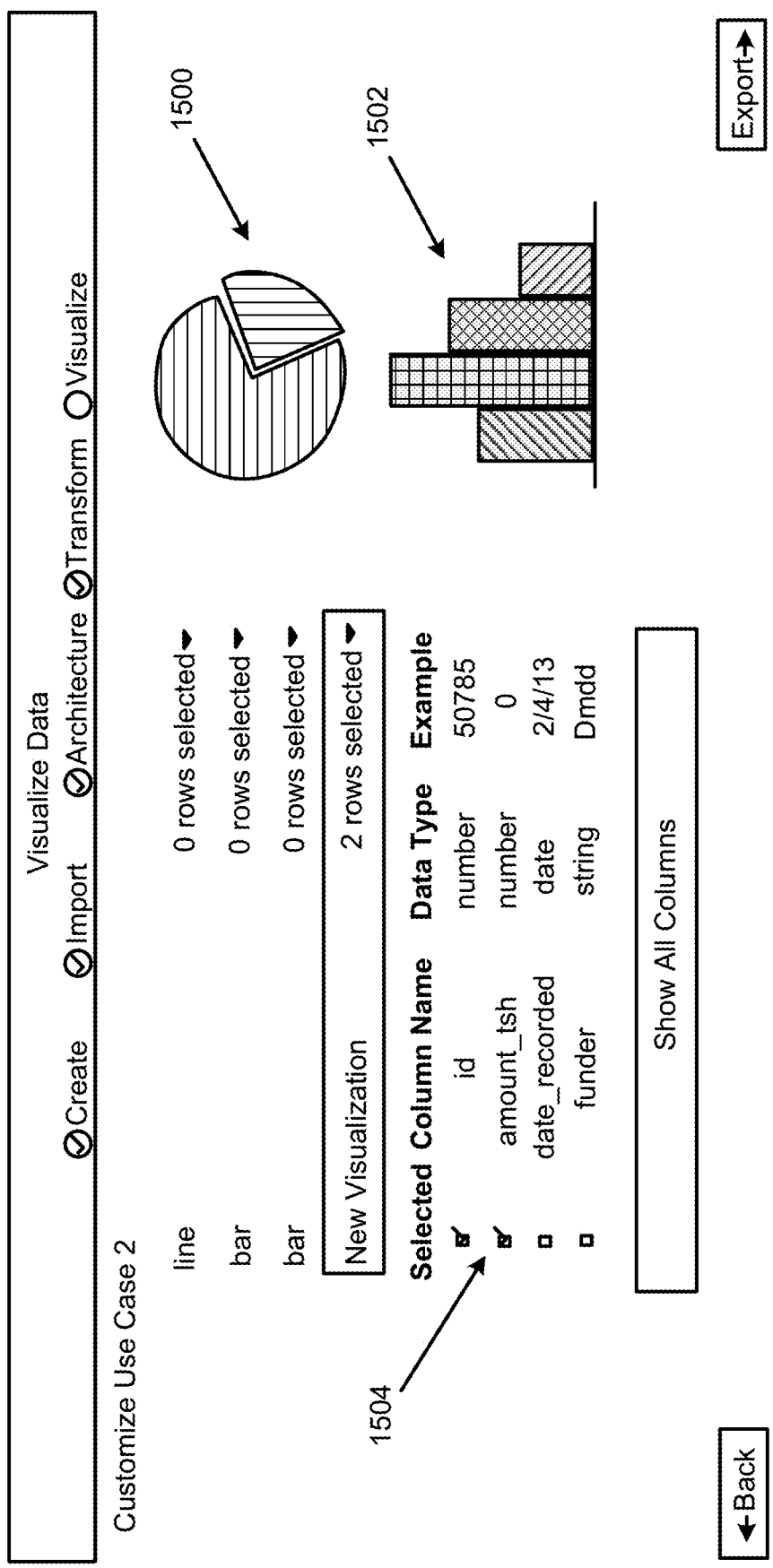
FIG. 15 illustrates adding of a new visualization to a use case for the intelligent visualization munging system of FIG. 1, according to an example of the present disclosure.

FIG. 15 illustrates adding of a new visualization to a use case for the system 100, according to an example of the present disclosure.

Referring to FIG. 15, with respect to customization, a user may add additional visualizations (e.g., at 1500 and 1502) to the use case. For example, as shown in FIG. 15, all of the available columns may be presented for a user to choose from. As the user selects columns (e.g., at 1504), the appropriate visualization may be highlighted so that the user is informed which visualization best matches the selected data. Once complete, a user may export the results to a visualization platform that will transform their choices into interactive visualizations that may be modified as needed.

Referring again to FIG. 1, the data anomaly analyzer 124 may access the data 104 that is to be analyzed for an anomaly. The data anomaly analyzer 124 may determine, based on the transformation and enrichment of the data 104, the determination of the features, the determination of user role and/or the user interaction (and/or the target role and/or the target interaction), and the learning of the behavior of the user (and/or target), whether the data 104 includes the anomaly. That is, absent the transformation and enrichment of the data, the determination of the features, the determination of user role and/or the user interaction (and/or the target role and/or the target interaction), and the learning of the behavior of the user, the anomaly may not otherwise be identifiable. For example, the data 104 may be transformed to extract and display time series information from the data. For example, the data 104 may be transformed to extract and display hour and minute information in the form of "N:NN" and "NN:NN". The time series information may be analyzed by the data anomaly analyzer 124 to detect an anomaly (e.g., where an anomaly represents a number of events in a predetermined time interval that exceeds a threshold, absence of a continuous set of events within a predetermined time interval, etc.). Further, the features, the user role and/or the user interaction (and/or the target role and/or the target interaction), and the learning of the behavior of the user (and/or target) may be analyzed to determine which particular visualization was previously selected for analysis of similar data, and for identification of the anomaly in the data 104 based on the selected visualization. Thus, absent the transformation and enrichment of the data, the determination of the features, the determination of user role and/or the user interaction (and/or the target role and/or the target interaction), and the learning of the behavior of the user (and/or target), the anomaly may not otherwise be identifiable in the visualization 118 that is recommended by the visualization recommender 114. In response to a determination that the data 104 includes the anomaly, the device controller 120 may control the device 122 associated with the data 104. Alternatively or additionally, a firewall associated with the data 104 and/or the device 122 may be controlled to place a network in a secure mode.

Figure 16:
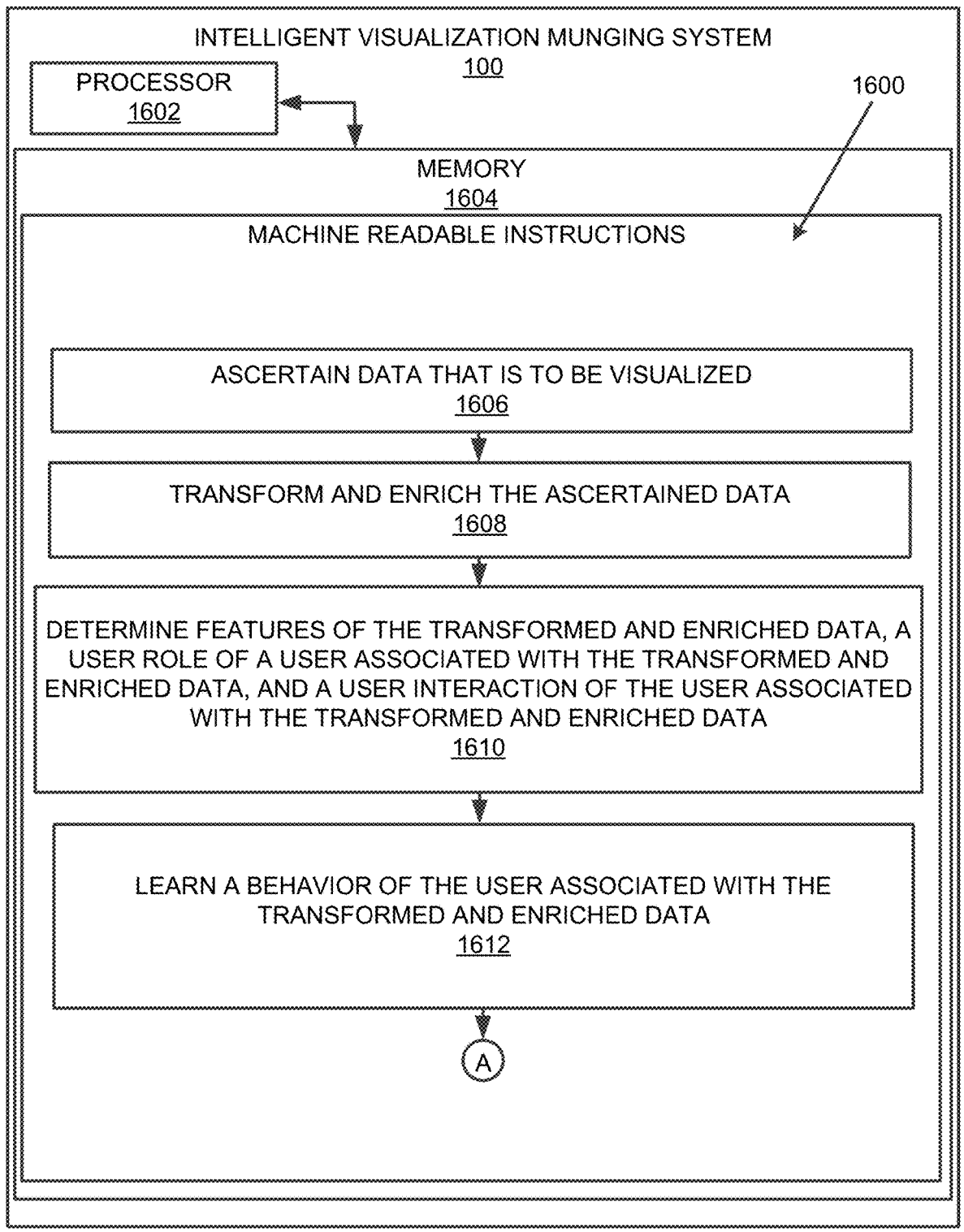
FIG. 16 illustrates a flowchart of a method for intelligent visualization munging, according to an example of the present disclosure.
Figure 16:
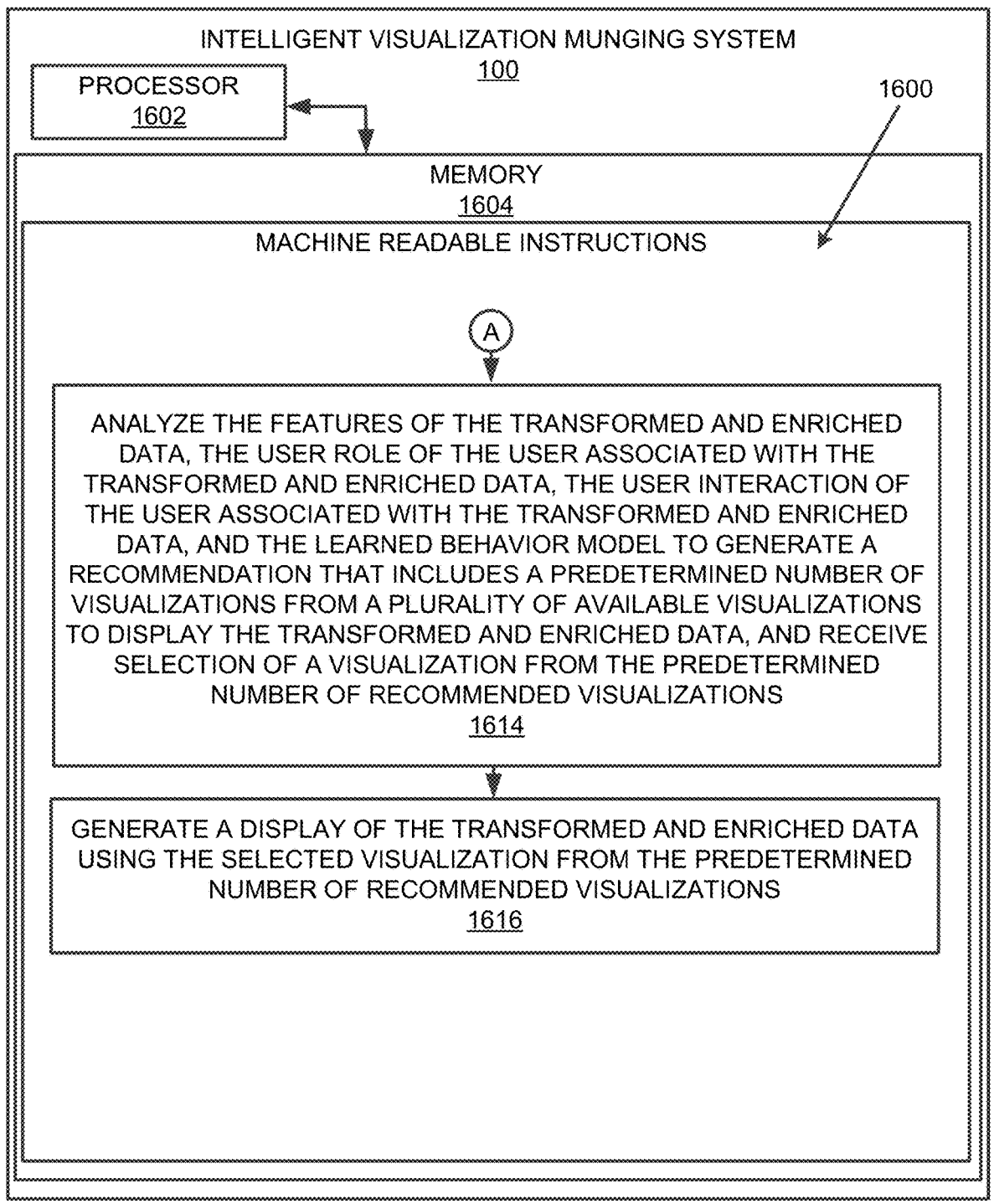
Figure 18:
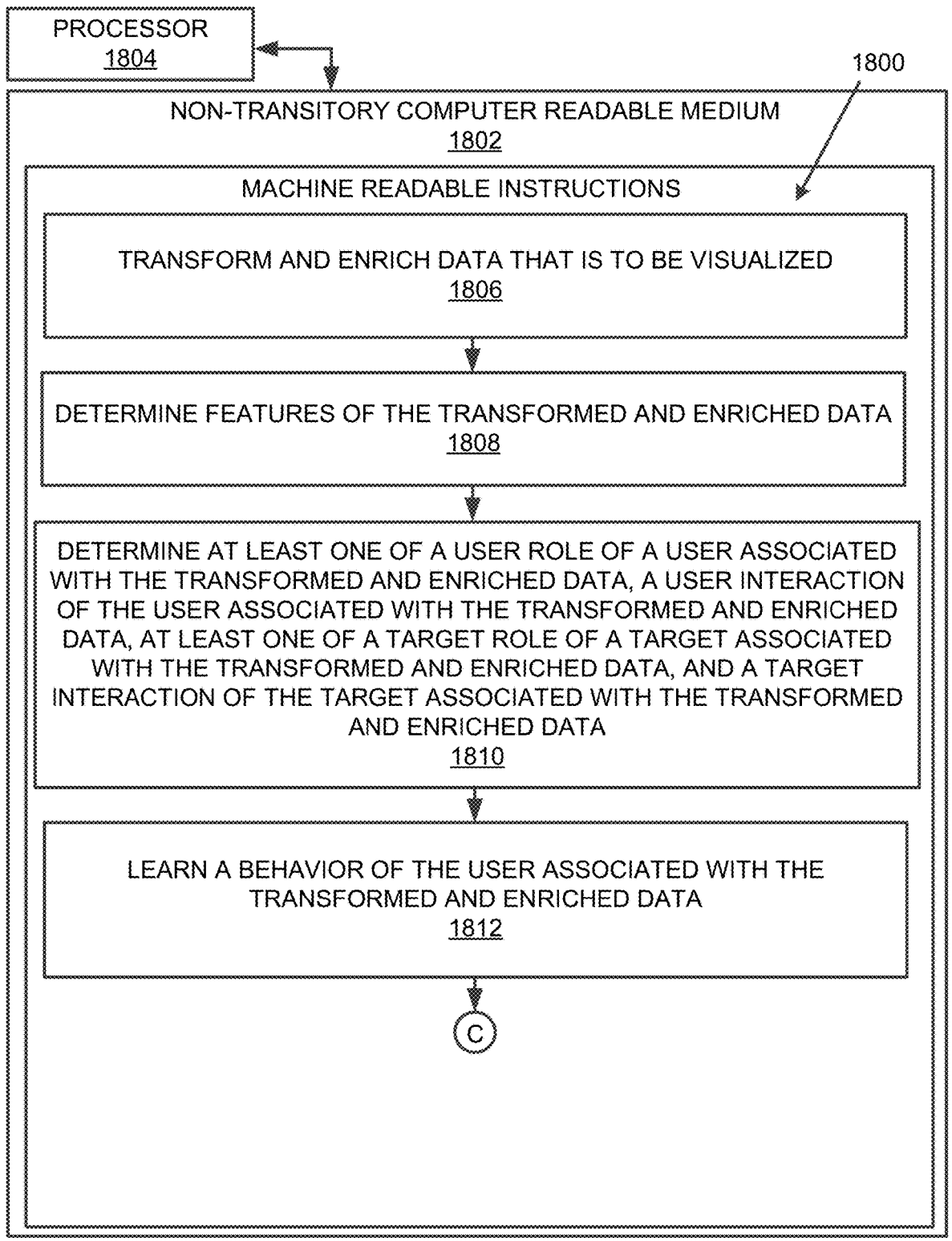
FIG. 18 illustrates a flowchart of a further method for intelligent visualization munging, according to an example of the present disclosure.
Figure 18:
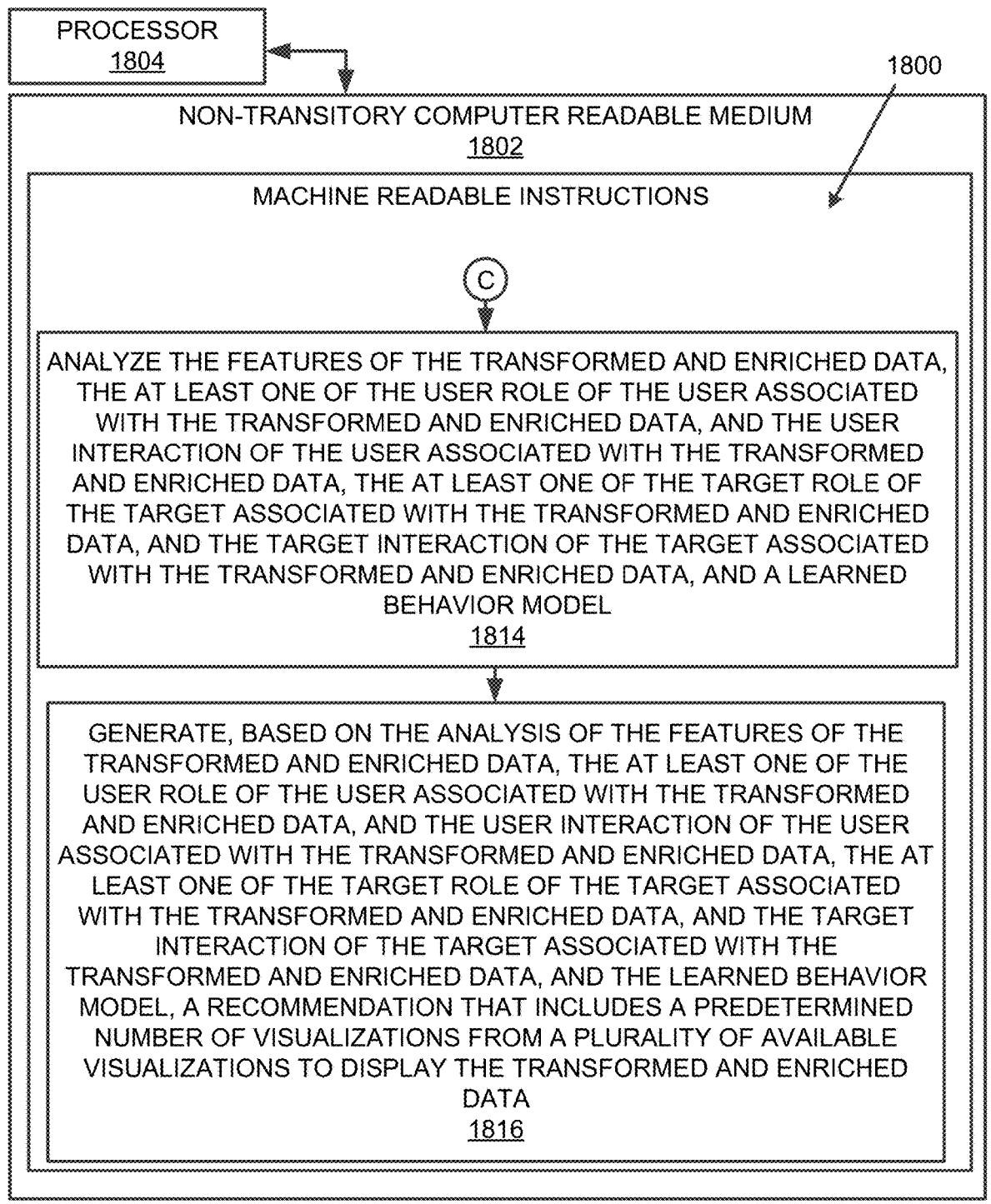

FIGS. 16-18 respectively illustrate flowcharts of methods 1600, 1700, and 1800 for intelligent visualization munging, according to examples. The methods 1600, 1700, and 1800 may be implemented on the system 100 described above with reference to FIGS. 1-15 by way of example and not limitation. The methods 1600, 1700, and 1800 may be practiced in other system. In addition to showing the method 1600, FIG. 16 shows hardware of the system 100 that may execute the method 1600. The hardware may include a processor 1602, and a memory 1604 storing machine readable instructions that when executed by the processor cause the processor to perform the steps of the method 1600. The memory 1604 may represent a non-transitory computer readable medium. FIG. 17 may represent a method for intelligent visualization munging, and the steps of the method. FIG. 18 may represent a non-transitory computer readable medium 1802 having stored thereon machine readable instructions to provide intelligent visualization munging. The machine readable instructions, when executed, cause a processor 1804 to perform steps of the method 1800 also shown in FIG. 18.

The processor 1602 of FIG. 16 and/or the processor 1804 of FIG. 18 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1802 of FIG. 18), such as hardware storage devices (e.g., RAM (random access memory), ROM (read only memory), EPROM (erasable, programmable ROM), EEPROM (electrically erasable, programmable ROM), hard drives, and flash memory). The memory 1604 may include a RAM, where the machine readable instructions and data for a processor may reside during runtime.

Referring to FIGS. 1-16, and particularly to the method 1600 shown in FIG. 16, at block 1606, the method 1600 may include ascertaining (e.g., by the data loader 102) data that is to be visualized.

At block 1608, the method 1600 may include transforming and enriching (e.g., by the data iterator 106) the ascertained data 104.

At block 1610, the method 1600 may include determining (e.g., by the data feature and role discoverer 108) features of the transformed and enriched data 104, a user role of a user associated with the transformed and enriched data 104, and a user interaction of the user associated with the transformed and enriched data 104.

At block 1612, the method 1600 may include learning (e.g., by the behavior learner 110) a behavior of the user associated with the transformed and enriched data 104.

At block 1614, the method 1600 may include analyzing (e.g., by the visualization recommender 114) the features of the transformed and enriched data 104, the user role of the user associated with the transformed and enriched data 104, the user interaction of the user associated with the transformed and enriched data 104, and the learned behavior model 112 to generate a recommendation that includes a predetermined number of visualizations 118 from a plurality of available visualization to display the transformed and enriched data 104. The predetermined number of visualizations 118 is less than the plurality of available visualization. Further, the visualization recommender 114 may receive selection of a visualization from the predetermined number of recommended visualizations 118.

At block 1616, the method 1600 may include generating (e.g., by the results generator 116) a display of the transformed and enriched data 104 using the selected visualization from the predetermined number of recommended visualizations 118.

According to examples, for the method 1600, the data feature and role discoverer 108 may determine a target role of a target associated with the transformed and enriched data 104, and a target interaction of the target associated with the transformed and enriched data 104, and the visualization recommender 114 may analyze the features of the transformed and enriched data 104, the user role of the user associated with the transformed and enriched data 104, the user interaction of the user associated with the transformed and enriched data 104, the target role of the target associated with the transformed and enriched data 104, and the target interaction of the target associated with the transformed and enriched data 104, and the learned behavior model 112 to generate the recommendation that includes the predetermined number of visualizations 118 from the plurality of available visualization to display the transformed and enriched data 104.

According to examples, for the method 1600, the data feature and role discoverer 108 may determine the features of the transformed and enriched data 104 by classifying internet protocol (IP) addresses associated with the transformed and enriched data 104 into source IP and target IP addresses, and classifying relationships between user roles including the user role and the IP addresses associated with the transformed and enriched data 104.

According to examples, for the method 1600, the data feature and role discoverer 108 may determine the user role of the user associated with the transformed and enriched data 104, and the user interaction of the user associated with the transformed and enriched data 104 by analyzing a user field of the transformed and enriched data 104 to determine an identity of the user, mapping the identity of the user to an organizational data set, and determining, based on the mapping of the identity of the user to the organizational data set, the user role of the user associated with the transformed and enriched data 104.

According to examples, for the method 1600, the data iterator 106 may transform and enrich the ascertained data 104 by performing field division to divide the ascertained data 104 into a plurality of fields.

According to examples, for the method 1600, the data iterator 106 may transform and enrich the ascertained data 104 by obfuscating a user field for the user associated with the transformed and enriched data 104 in the ascertained data 104.

According to examples, for the method 1600, the data iterator 106 may transform and enrich the ascertained data 104 by identifying a plurality of timestamp fields in the ascertained data 104, identifying, from the plurality of timestamp fields in the ascertained data 104, a relevant timestamp field, and transforming field values for the relevant timestamp field to a standardized time format.

According to examples, for the method 1600, the behavior learner 110 may enrich the learned behavior model 112 based on the learned behavior of the user associated with the transformed and enriched data 104 by applying multinomial logistic regression to the features of the transformed and enriched data 104, the user role of the user associated with the transformed and enriched data 104, the user interaction of the user associated with the transformed and enriched data 104, and the learned behavior of the user associated with the transformed and enriched data 104. The learned behavior of the user associated with the transformed and enriched data 104 may include the selection of the visualization 118 from the predetermined number of recommended visualizations 118.

Referring to FIGS. 1-15 and 17, and particularly FIG. 17, for the method 1700, at block 1702, the method may include transforming and enriching data 104 that is to be visualized.

At block 1704, the method 1700 may include determining features of the transformed and enriched data 104.

At block 1706, the method 1700 may include determining a user role of a user associated with the transformed and enriched data 104, and a user interaction of the user associated with the transformed and enriched data 104.

At block 1708, the method 1700 may include learning a behavior of the user associated with the transformed and enriched data 104.

At block 1710, the method 1700 may include analyzing the features of the transformed and enriched data 104, the user role of the user associated with the transformed and enriched data 104, the user interaction of the user associated with the transformed and enriched data 104, and the learned behavior model 112.

At block 1712, the method 1700 may include generating, based on the analysis of the features of the transformed and enriched data 104, the user role of the user associated with the transformed and enriched data 104, the user interaction of the user associated with the transformed and enriched data 104, and the learned behavior model 112, a recommendation that includes a predetermined number of visualizations 118 from a plurality of available visualization to display the transformed and enriched data 104. The predetermined number of visualizations 118 may be less than the plurality of available visualization.

At block 1712, the method 1700 may include identifying (e.g., by the data anomaly analyzer 124), based on the analysis of the features of the transformed and enriched data, the user role of the user associated with the transformed and enriched data, the user interaction of the user associated with the transformed and enriched data, and the learned behavior model 112, an anomaly in displays of the recommended visualizations.

According to examples, the method 1700 may further include receiving selection of a visualization from the predetermined number of recommended visualizations 118, and generating a display of the transformed and enriched data 104 using the selected visualization from the predetermined number of recommended visualizations 118.

According to examples, the method 1700 may further include determining a target role of a target associated with the transformed and enriched data 104, and a target interaction of the target associated with the transformed and enriched data 104. Further, analyzing the features of the transformed and enriched data 104, the user role of the user associated with the transformed and enriched data 104, the user interaction of the user associated with the transformed and enriched data 104, and the learned behavior model 112, and generating, based on the analysis of the features of the transformed and enriched data 104, the user role of the user associated with the transformed and enriched data 104, the user interaction of the user associated with the transformed and enriched data 104, and the learned behavior model 112, the recommendation that includes the predetermined number of visualizations 118 from the plurality of available visualization to display the transformed and enriched data 104, may further include analyzing the features of the transformed and enriched data 104, the user role of the user associated with the transformed and enriched data 104, and the user interaction of the user associated with the transformed and enriched data 104, the target role of the target associated with the transformed and enriched data 104, and the target interaction of the target associated with the transformed and enriched data 104, and the learned behavior model 112 to generate the recommendation that includes the predetermined number of visualizations 118 from the plurality of available visualization to display the transformed and enriched data 104.

According to examples, the method 1700 may further include identifying (e.g., by the data anomaly analyzer 124), based on the analysis of the features of the transformed and enriched data, the user role of the user associated with the transformed and enriched data, and/or the user interaction of the user associated with the transformed and enriched data, the target role of the target associated with the transformed and enriched data, and/or the target interaction of the target associated with the transformed and enriched data, and the learned behavior model 112, an anomaly in displays of the recommended visualizations.

According to examples, the method 1700 may further include enriching the learned behavior model 112 based on the learned behavior of the user associated with the transformed and enriched data 104 by applying multinomial logistic regression to the features of the transformed and enriched data 104, the user role of the user associated with the transformed and enriched data 104, the user interaction of the user associated with the transformed and enriched data 104, and the learned behavior of the user associated with the transformed and enriched data 104. The learned behavior of the user associated with the transformed and enriched data 104 may include the selection of the visualization from the predetermined number of recommended visualizations 118.

According to examples, the method 1700 may further include generating a new learned behavior model 112 based on the learned behavior of the user associated with the transformed and enriched data 104 by determining whether a number of selections of non-recommended visualizations exceeds a predetermined selection number threshold within a predetermined time threshold, and in response to a determination that the number of selections of non-recommended visualizations exceeds the predetermined selection number threshold within the predetermined time threshold, applying multinomial logistic regression to the features of the transformed and enriched data 104, the user role of the user associated with the transformed and enriched data 104, the user interaction of the user associated with the transformed and enriched data 104, and the learned behavior of the user associated with the transformed and enriched data 104. The learned behavior of the user associated with the transformed and enriched data 104 may include the selection of the non-recommended visualizations.

Referring to FIGS. 1-15 and 18, and particularly FIG. 18, for the method 1800, at block 1806, the method may include transforming and enriching data 104 that is to be visualized.

At block 1808, the method 1800 may include determining features of the transformed and enriched data 104.

At block 1810, the method 1800 may include determining a user role of a user associated with the transformed and enriched data 104, and/or a user interaction of the user associated with the transformed and enriched data 104, and a target role of a target associated with the transformed and enriched data 104, and/or a target interaction of the target associated with the transformed and enriched data 104.

At block 1812, the method 1800 may include learning a behavior of the user associated with the transformed and enriched data 104.

At block 1814, the method 1800 may include analyzing the features of the transformed and enriched data 104, the user role of the user associated with the transformed and enriched data 104, and/or the user interaction of the user associated with the transformed and enriched data 104, the target role of the target associated with the transformed and enriched data 104, and/or the target interaction of the target associated with the transformed and enriched data 104, and the learned behavior model 112.

At block 1816, the method 1800 may include generating, based on the analysis of the features of the transformed and enriched data 104, the user role of the user associated with the transformed and enriched data 104, and/or the user interaction of the user associated with the transformed and enriched data 104, the target role of the target associated with the transformed and enriched data 104, and/or the target interaction of the target associated with the transformed and enriched data 104, and the learned behavior model 112, a recommendation that includes a predetermined number of visualizations 118 from a plurality of available visualization to display the transformed and enriched data 104. The predetermined number of visualizations 118 may be less than the plurality of available visualization.

According to examples, the method 1800 may further include enriching the learned behavior model 112 based on the learned behavior of the user associated with the transformed and enriched data 104 by applying multinomial logistic regression to the features of the transformed and enriched data 104, the user role of the user associated with the transformed and enriched data 104, and/or the user interaction of the user associated with the transformed and enriched data 104, the target role of the target associated with the transformed and enriched data 104, and/or the target interaction of the target associated with the transformed and enriched data 104, and the learned behavior of the user associated with the transformed and enriched data 104. The learned behavior of the user associated with the transformed and enriched data 104 may include a selection of a visualization from the predetermined number of recommended visualizations 118.

According to examples, the method 1800 may further include generating a new learned behavior model 112 based on the learned behavior of the user associated with the transformed and enriched data 104 by determining whether a number of selections of non-recommended visualizations exceeds a predetermined selection number threshold within a predetermined time threshold, and in response to a determination that the number of selections of non-recommended visualizations exceeds the predetermined selection number threshold within the predetermined time threshold, applying multinomial logistic regression to the features of the transformed and enriched data 104, the user role of the user associated with the transformed and enriched data 104, and/or the user interaction of the user associated with the transformed and enriched data 104, the target role of the target associated with the transformed and enriched data 104, and/or the target interaction of the target associated with the transformed and enriched data 104, and the learned behavior of the user associated with the transformed and enriched data 104. The learned behavior of the user associated with the transformed and enriched data 104 may include a selection of a non-recommended visualizations.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An intelligent visualization munging system comprising:
    a data loader, executed by at least one hardware processor, to ascertain data that is to be visualized;
    a data iterator, executed by the at least one hardware processor, to transform and enrich the ascertained data;
    a data feature and role discoverer, executed by the at least one hardware processor, to
        determine features of the transformed and enriched data,
        determine a user role of a user associated with the transformed and enriched data, and a user interaction of the user associated with the transformed and enriched data, wherein the user is a person or entity that is currently using or is associated with the ascertained data, and
        determine a target role of a target associated with the transformed and enriched data, and a target interaction of the target associated with the transformed and enriched data;
    a behavior learner, executed by the at least one hardware processor, to
        learn a behavior of the user associated with the transformed and enriched data;
    a visualization recommender, executed by the at least one hardware processor, to
        analyze the features of the transformed and enriched data, the user role of the user associated with the transformed and enriched data, the user interaction of the user associated with the transformed and enriched data, the target role of the target associated with the transformed and enriched data, the target interaction of the target associated with the transformed and enriched data, and a learned behavior model to generate a recommendation that includes a predetermined number of visualizations from a plurality of available visualizations to graphically display the transformed and enriched data, wherein the predetermined number of visualizations is less than the plurality of available visualizations,
        receive selection of a visualization by the user from the predetermined number of recommended visualizations where the selected visualization is recommended for the target that includes another person or another entity that is to use or is associated with the selected visualization, and
        generate a new learned behavior model based on the learned behavior of the user associated with the transformed and enriched data by
            determining whether a number of selections of non-recommended visualizations exceeds a predetermined selection number threshold within a predetermined time threshold, and
            in response to a determination that the number of selections of non-recommended visualizations exceeds the predetermined selection number threshold within the predetermined time threshold applying multinomial logistic regression to the features of the transformed and enriched data, at least one of the user role of the user associated with the transformed and enriched data, or the user interaction of the user associated with the transformed and enriched data, at least one of the target role of the target associated with the transformed and enriched data, or the target interaction of the target associated with the transformed and enriched data, and the learned behavior of the user associated with the transformed and enriched data, wherein the learned behavior of the user associated with the transformed and enriched data includes a selection of a non-recommended visualization; and
    a results generator, executed by the at least one hardware processor, to generate a graphical display of the transformed and enriched data using the selected visualization from the predetermined number of recommended visualizations.

2. The intelligent visualization munging system according to claim 1, wherein the data feature and role discoverer is to determine the features of the transformed and enriched data by classifying internet protocol (IP) addresses associated with the transformed and enriched data into source IP and target IP addresses, and classifying relationships between user roles including the user role and the IP addresses associated with the transformed and enriched data.

3. The intelligent visualization munging system according to claim 1, wherein the data feature and role discoverer is to determine the user role of the user associated with the transformed and enriched data, and the user interaction of the user associated with the transformed and enriched data by analyzing a user field of the transformed and enriched data to determine an identity of the user, mapping the identity of the user to an organizational data set, and determining, based on the mapping of the identity of the user to the organizational data set, the user role of the user associated with the transformed and enriched data.

4. The intelligent visualization munging system according to claim 1, wherein the data iterator is to transform and enrich the ascertained data by performing field division to divide the ascertained data into a plurality of fields.

5. The intelligent visualization munging system according to claim 1, wherein the data iterator is to transform and enrich the ascertained data by obfuscating a user field for the user associated with the transformed and enriched data in the ascertained data.

6. The intelligent visualization munging system according to claim 1, wherein the data iterator is to transform and enrich the ascertained data by identifying a plurality of timestamp fields in the ascertained data, identifying, from the plurality of timestamp fields in the ascertained data, a relevant timestamp field, and transforming field values for the relevant timestamp field to a standardized time format.

7. The intelligent visualization munging system according to claim 1, wherein the visualization recommender is to generate the recommendation that includes the predetermined number of visualizations from the plurality of available visualizations to graphically display the transformed and enriched data by:

identifying a plurality of classes that include a highest probability of corresponding to the features of the transformed and enriched data, the user role of the user associated with the transformed and enriched data, the user interaction of the user associated with the transformed and enriched data, the target role of the target associated with the transformed and enriched data, and the target interaction of the target associated with the transformed and enriched data; and identifying, based on a determination that the plurality of identified classes exceed a specified threshold, the predetermined number of visualizations from the plurality of available visualizations as the recommended visualizations.

8. The intelligent visualization munging system according to claim 1, further comprising:

a device controller, executed by the at least one hardware processor, to control, based on an identified anomaly in the graphical display of the transformed and enriched data, a device to initiate a lock-down mode of the device.

9. A method for intelligent visualization munging, the method comprising:

transforming and enriching, by at least one hardware processor, data that is to be visualized;

determining, by the at least one hardware processor, features of the transformed and enriched data;

determining, by the at least one hardware processor, a user role of a user associated with the transformed and enriched data, and a user interaction of the user associated with the transformed and enriched data, wherein the user is a person or entity that is currently using or is associated with the data that is to be visualized;

determining, by the at least one hardware processor, a target role of a target associated with the transformed and enriched data, and a target interaction of the target associated with the transformed and enriched data;

learning, by the at least one hardware processor, a behavior of the user associated with the transformed and enriched data;

analyzing, by the at least one hardware processor, the features of the transformed and enriched data, the user role of the user associated with the transformed and enriched data, the user interaction of the user associated with the transformed and enriched data, the target role of the target associated with the transformed and enriched data, the target interaction of the target associated with the transformed and enriched data, and a learned behavior model;

generating, by the at least one hardware processor, based on the analysis of the features of the transformed and enriched data, the user role of the user associated with the transformed and enriched data, the user interaction of the user associated with the transformed and enriched data, the target role of the target associated with the transformed and enriched data, the target interaction of the target associated with the transformed and enriched data, and the learned behavior model, a recommendation that includes a predetermined number of visualizations from a plurality of available visualizations to graphically display the transformed and enriched data, wherein the predetermined number of visualizations is less than the plurality of available visualizations;

identifying, by the at least one hardware processor, based on the analysis of the features of the transformed and enriched data, the user role of the user associated with the transformed and enriched data, the user interaction of the user associated with the transformed and enriched data, the target role of the target associated with the transformed and enriched data, the target interaction of the target associated with the transformed and enriched data, and the learned behavior model, an anomaly in displays of the recommended visualizations;

receiving, by the at least one hardware processor, selection of a visualization by the user from the predetermined number of recommended visualizations where the selected visualization is recommended for the target that includes another person or another entity that is to use or is associated with the selected visualization;

generating, by the at least one hardware processor, a new learned behavior model based on the learned behavior of the user associated with the transformed and enriched data by determining whether a number of selections of non-recommended visualizations exceeds a predetermined selection number threshold within a predetermined time threshold, and in response to a determination that the number of selections of non-recommended visualizations exceeds the predetermined selection number threshold within the predetermined time threshold applying multinomial logistic regression to the features of the transformed and enriched data, at least one of the user role of the user associated with the transformed and enriched data, or the user interaction of the user associated with the transformed and enriched data, at least one of the target role of the target associated with the transformed and enriched data, or the target interaction of the target associated with the transformed and enriched data, and the learned behavior of the user associated with the transformed and enriched data, wherein the learned behavior of the user associated with the transformed and enriched data includes a selection of a non-recommended visualization.

10. The method according to claim 9, further comprising:
generating, by the at least one hardware processor, a graphical display of the transformed and enriched data using the selected visualization from the predetermined number of recommended visualizations.

11. The method according to claim 9, wherein determining the user role of the user associated with the transformed and enriched data, and the user interaction of the user associated with the transformed and enriched data further comprises:
analyzing a user field of the transformed and enriched data to determine an identity of the user;
mapping the identity of the user to an organizational data set; and
determining, based on the mapping of the identity of the user to the organizational data set, the user role of the user associated with the transformed and enriched data.

12. The method according to claim 9, wherein transforming and enriching the data that is to be visualized further comprises at least one of:
performing field division to divide the data that is to be visualized into a plurality of fields; or
obfuscating a user field for the user associated with the transformed and enriched data in the data that is to be visualized.

13. The method according to claim 9, wherein transforming and enriching the data that is to be visualized further comprises:
identifying a plurality of timestamp fields in the data that is to be visualized,
identifying, from the plurality of timestamp fields in the data that is to be visualized, a relevant timestamp field, and
transforming field values for the relevant timestamp field to a standardized time format.

14. The method according to claim 9, further comprising:
controlling, by the at least one hardware processor, based on the identified anomaly, a device to initiate a lockdown mode of the device.

15. The method according to claim 9, further comprising:
determining, by the at least one hardware processor, the features of the transformed and enriched data by
classifying internet protocol (IP) addresses associated with the transformed and enriched data into source IP and target IP addresses, and
classifying relationships between user roles including the user role and the IP addresses associated with the transformed and enriched data.

16. A non-transitory computer readable medium having stored thereon machine readable instructions to provide intelligent visualization munging, the machine readable instructions, when executed, cause a processor to:
transform and enrich data that is to be visualized;
determine features of the transformed and enriched data;
determine
at least one of a user role of a user associated with the transformed and enriched data, or a user interaction of the user associated with the transformed and enriched data, wherein the user is a person or entity that is currently using or is associated with the data that is to be visualized, and
at least one of a target role of a target associated with the transformed and enriched data, or a target interaction of the target associated with the transformed and enriched data;
learn a behavior of the user associated with the transformed and enriched data;
analyze
the features of the transformed and enriched data,
the at least one of the user role of the user associated with the transformed and enriched data, or the user interaction of the user associated with the transformed and enriched data,
the at least one of the target role of the target associated with the transformed and enriched data, or the target interaction of the target associated with the transformed and enriched data, and
a learned behavior model;
generate, based on the analysis of the features of the transformed and enriched data, the at least one of the user role of the user associated with the transformed and enriched data, or the user interaction of the user associated with the transformed and enriched data, the at least one of the target role of the target associated with the transformed and enriched data, or the target interaction of the target associated with the transformed and enriched data, and the learned behavior model, a recommendation that includes a predetermined number of visualizations from a plurality of available visualizations to graphically display the transformed and enriched data, wherein the predetermined number of visualizations is less than the plurality of available visualizations;
receive selection of a visualization by the user from the predetermined number of recommended visualizations where the selected visualization is recommended for the target that includes another person or another entity that is to use or is associated with the selected visualization; and
generate a new learned behavior model based on the learned behavior of the user associated with the transformed and enriched data by
determining whether a number of selections of non-recommended visualizations exceeds a predetermined selection number threshold within a predetermined time threshold, and
in response to a determination that the number of selections of non-recommended visualizations exceeds the predetermined selection number threshold within the predetermined time threshold
applying multinomial logistic regression to the features of the transformed and enriched data, the at least one of the user role of the user associated with the transformed and enriched data, or the user interaction of the user associated with the transformed and enriched data, the at least one of the target role of the target associated with the transformed and enriched data, or the target interaction of the target associated with the transformed and enriched data, and the learned behavior of the user associated with the transformed and enriched data, wherein the learned behavior of the user associated with the transformed and enriched data includes a selection of a non-recommended visualization.

17. The non-transitory computer readable medium of claim 16, further comprising the machine readable instructions, when executed, further cause the processor to:
generate a graphical display of the transformed and enriched data using the selected visualization from the predetermined number of recommended visualizations.

18. The non-transitory computer readable medium of claim 17, further comprising the machine readable instructions, when executed, further cause the processor to:
control, based on an identified anomaly in the graphical display of the transformed and enriched data, a device to initiate a lock-down mode of the device.

19. The non-transitory computer readable medium of claim 16, further comprising the machine readable instructions, when executed, further cause the processor to:
determine the features of the transformed and enriched data by
classifying internet protocol (IP) addresses associated with the transformed and enriched data into source IP and target IP addresses, and
classifying relationships between user roles including the user role and the IP addresses associated with the transformed and enriched data.

\* \* \* \* \*